United States Patent [19]

D'Antonio et al.

[11] 4,291,894
[45] Sep. 29, 1981

[54] ELECTRICAL SKI BOOT RELEASE

[76] Inventors: Nicholas F. D'Antonio, 7695 Admiral Dr., Liverpool, N.Y. 13088; Richard L. Bates, 125 Hillside Way, Camillus, N.Y. 13031

[21] Appl. No.: 467,821

[22] Filed: May 7, 1974

[51] Int. Cl.³ ............................................. A63C 9/08
[52] U.S. Cl. .................................... 280/612; 280/611; 280/621; 280/623; 280/624
[58] Field of Search ................. 280/11.35 M, 11.35 C, 280/625, 612, 611, 621, 623, 624

[56] References Cited

U.S. PATENT DOCUMENTS

| | | | |
|---|---|---|---|
| 3,246,907 | 4/1966 | Chisholm | 280/11.35 M |
| 3,367,672 | 2/1968 | Tonozzi et al. | 280/11.35 M |
| 3,671,054 | 6/1972 | Mittelstadt | 280/11.35 M |
| 3,762,735 | 10/1973 | Smolka | 280/11.35 M |
| 3,774,922 | 11/1973 | Smolka et al. | 280/11.35 M |
| 3,776,566 | 12/1973 | Smolka | 280/11.35 M |
| 3,802,715 | 4/1974 | Smolka et al. | 280/612 |
| 3,806,144 | 4/1974 | Yans | 280/11.35 C |

FOREIGN PATENT DOCUMENTS

| | | |
|---|---|---|
| 308606 | 7/1973 | Austria . |
| 2014935 | 10/1971 | Fed. Rep. of Germany ... 280/11.35 M |
| 2049994 | 4/1972 | Fed. Rep. of Germany ... 280/11.35 M. |
| 2128305 | 10/1972 | France . |
| 1236024 | 6/1971 | United Kingdom . |
| 1276580 | 6/1972 | United Kingdom . |

Primary Examiner—Joseph F. Peters, Jr.
Assistant Examiner—Milton L. Smith
Attorney, Agent, or Firm—Squire, Sanders & Dempsey

[57] ABSTRACT

Apparatus for releasing a binding which fastens a ski boot to a ski, produces one or more electrical signals corresponding to the force between the ski and the ski boot and the torque between the ski and the ski boot, and actuates a ski boot release mechanism when the force or torque or a combination of both exceed predetermined values.

48 Claims, 19 Drawing Figures

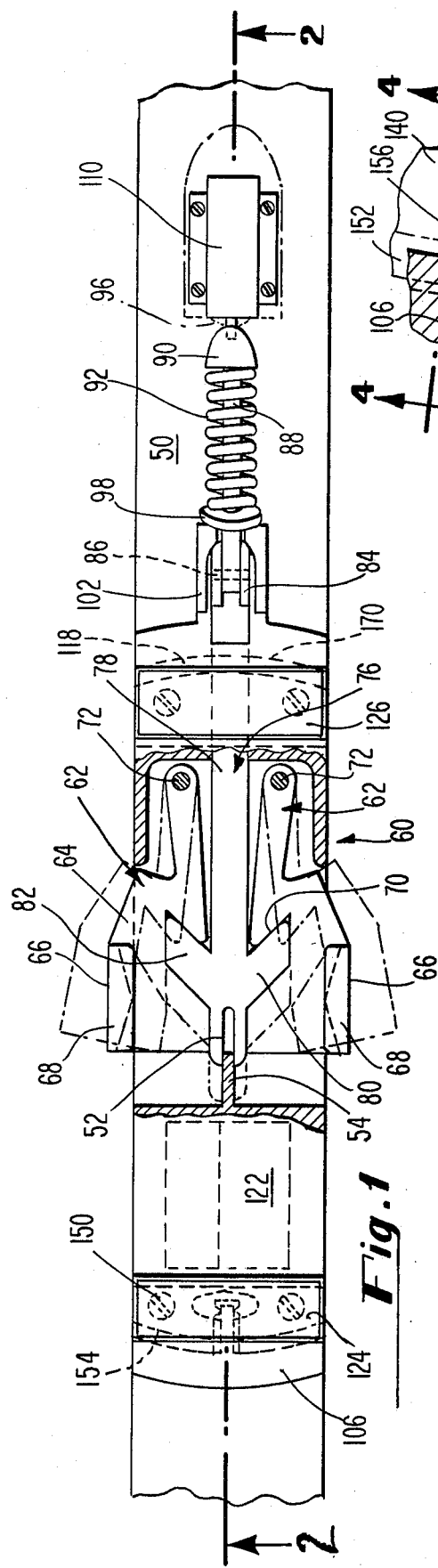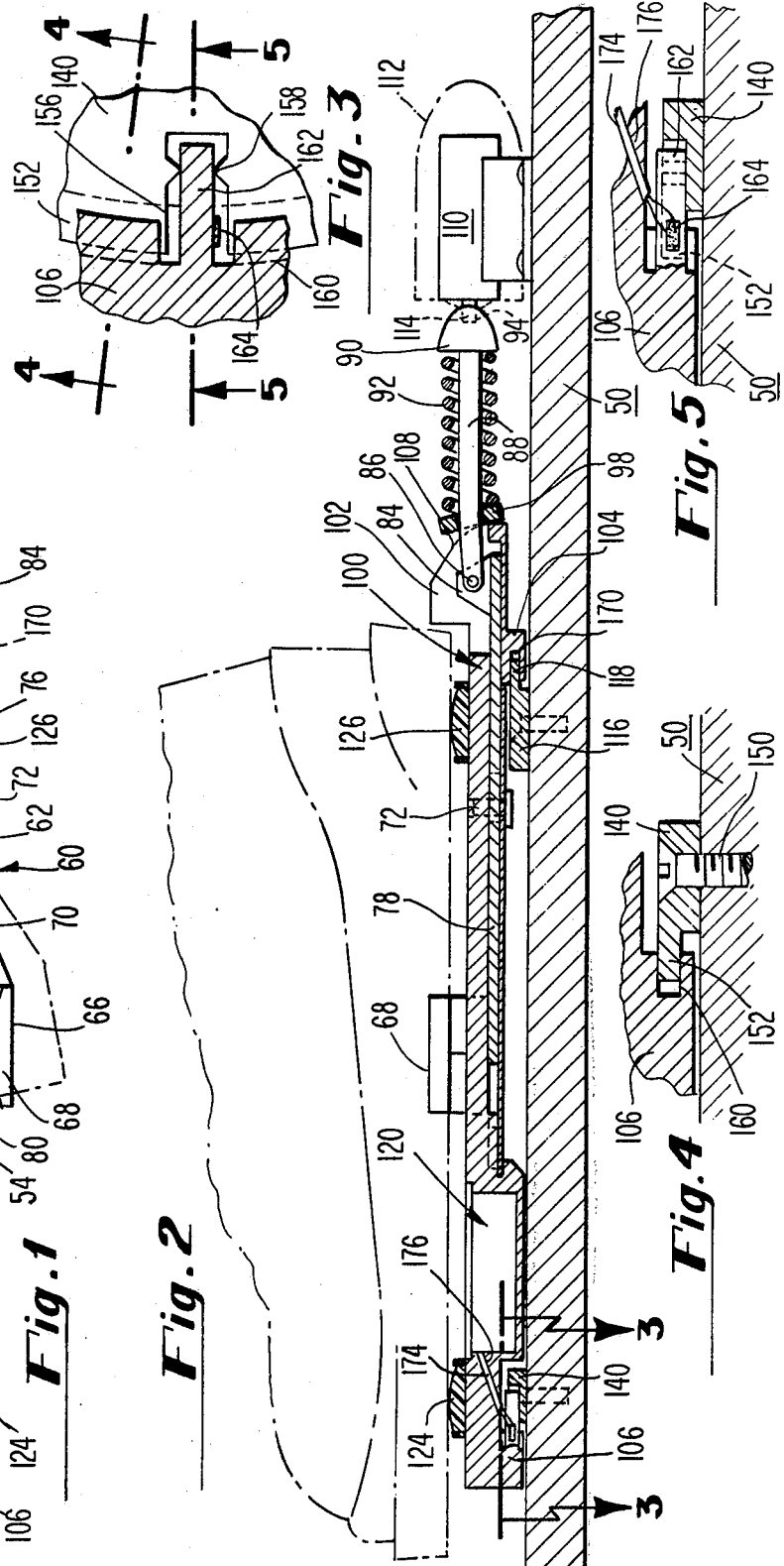

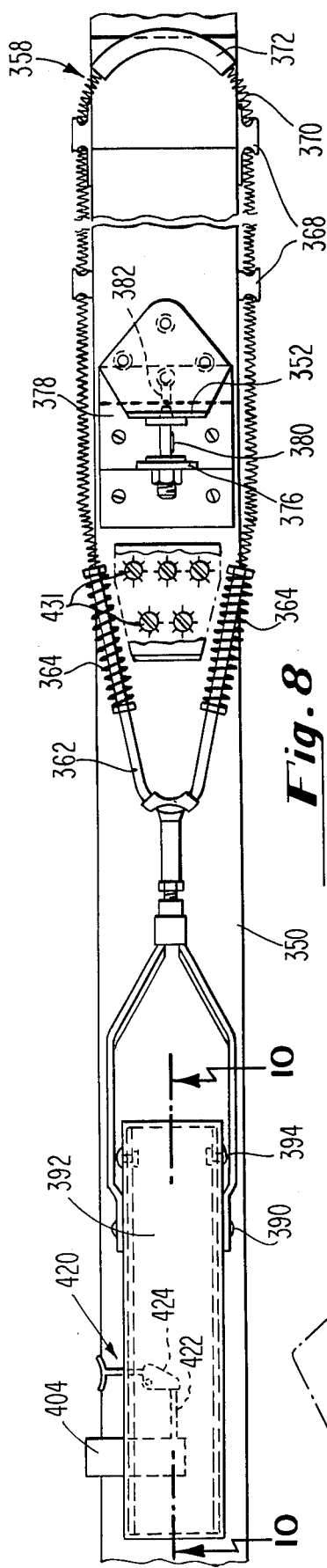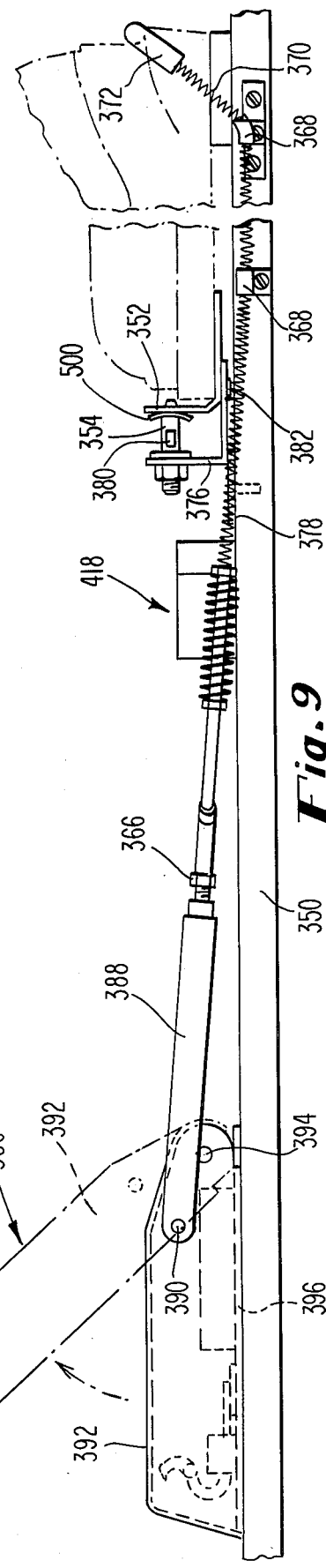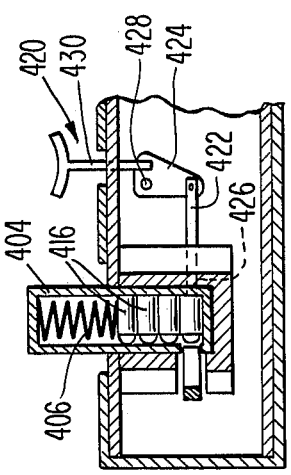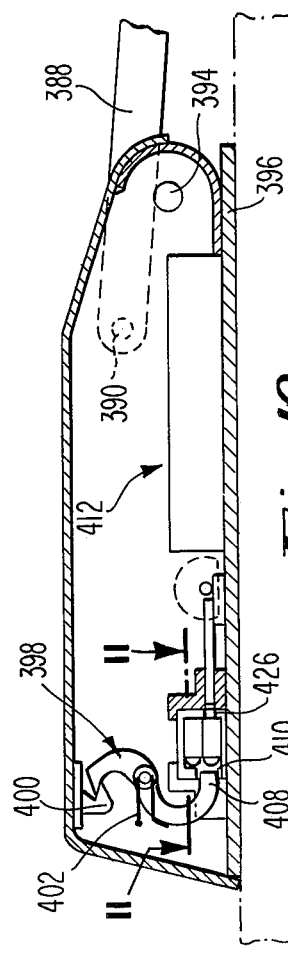

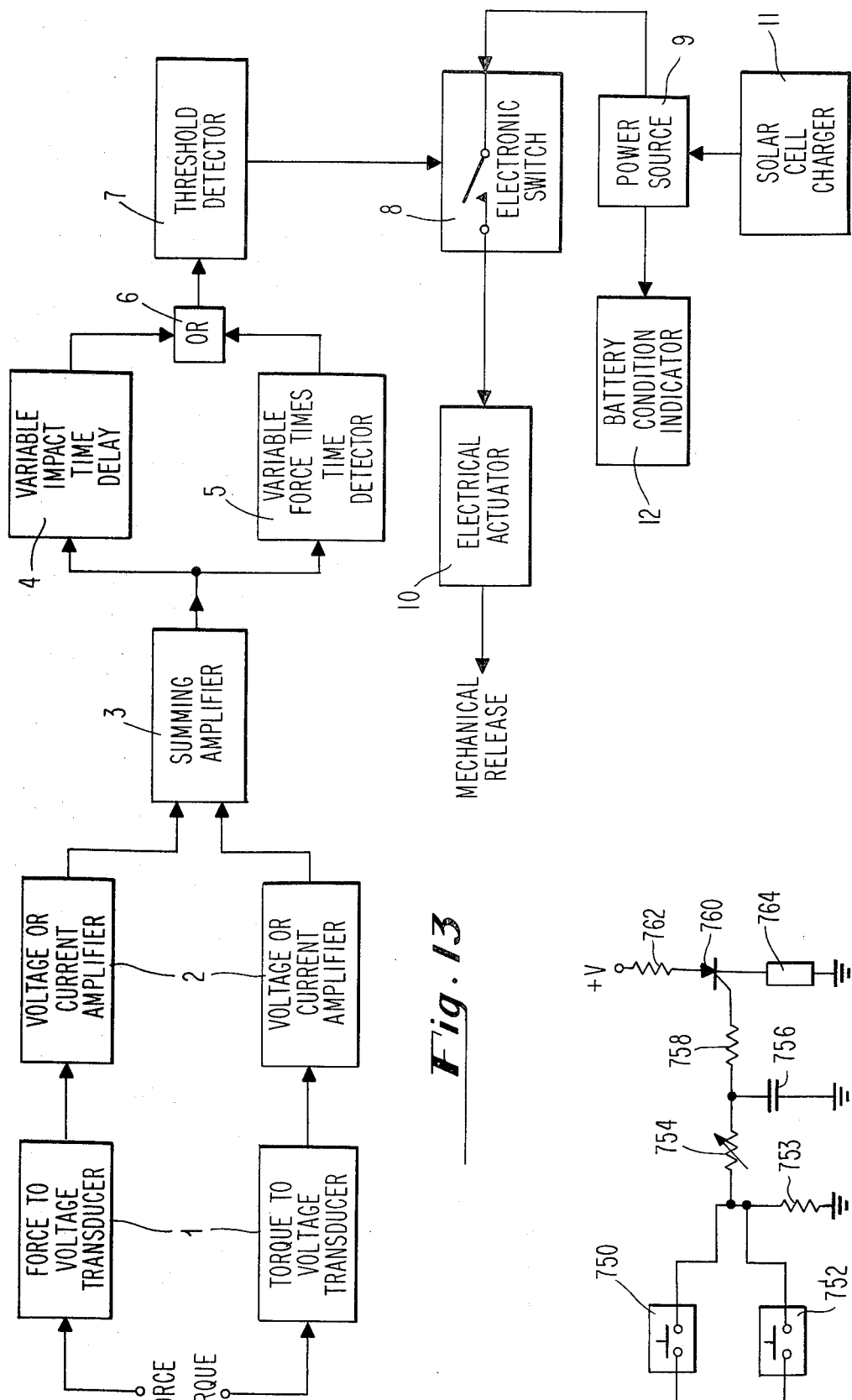

ELECTRICAL SKI BOOT RELEASE

BACKGROUND OF THE INVENTION

1. Field of the Invention

This invention relates to apparatus for electrically initiating release of a ski binding in response to a signal which is proportional to the tensile, compressive or torsional force between the ski boot and the ski.

2. State of the Art

In order to achieve the optimum safety and convenience of handling of skis, it is necessary for each boot of the skier to be fixed rigidly with respect to the ski. However, in the event of a potentially dangerous fall, it is extremely important to disengage the ski boots from the skis, in order to minimize the possibility of injury. As a result of these hazards, safety bindings have been developed for the purpose of releasably fastening a ski boot to a ski, so that the ski boot is rigidly fixed to the ski during normal conditions of use, and whereby extreme bending, tensile or compressive forces on the ski that may occur during a fall would operate to actuate a release mechanism to unclamp the ski boot with respect to the ski, so that the ski, during fall, could separate from the boot, thereby lessening the risk of injury to the skier.

Many types of safety bindings exist, and some of the commonly utilized bindings are the Cubco, Tyrolia, Marker, Spademan, Americana, Gertsch, Look Nevada, Rosemount and Salomon bindings.

One of the most recent binding developments is the Spademan binding, which, unlike most of the other bindings, engages the ski boot at the sides, rather than at the heel and toe. The general design of a Spademan binding is illustrated in U.S. Pat. No. Re. 26,972.

The current state-of-the-art ski bindings are operative for their intended purpose, to some extent. However, they have numerous shortcomings. Among these are the fact that all release systems presently available require significant rotational movement between the ski and boot, in order to actuate the release mechanism. This movement is, of course, accompanied by a frictional force which resists this movement. If the friction were constant, it could be assumed that a reliable mechanical system of a highly predictable nature would function safely and accurately. However, this is not the case, because the frictional forces that must be overcome are a function of the particular orientation of the skier and the amount of dirt or ice between or around the moving surfaces during the fall. Accordingly, all of the current state-of-the-art ski bindings, although they are initially adjustable by setting the spring force which must be overcome in order to obtain release of the binding, do not, in practice, function in the intended manner and are therefore not completely reliable and predictable. This is so because of the snow and dirt which accumulates between the ski boot and the ski binding or surface and because of the varying angles at which force is applied between the ski boot and ski binding and surface. Too, when a free fall occurs, the downward force between the ski and boot may be much greater than the force which is assumed when the release is "set" in a test fixture. Therefore, in a real free fall situation significantly larger additional side loads may be required to get sufficient movement of the boot relative to the ski to effect release.

Moreover, the current state-of-the-art bindings do not make provision for the effect of time with respect to any given force, in determining when the ski should be released. For example, an aggressive skier, when skiing, will impose very high forces on his skis in the normal and usual course of skiing. These substantial forces will usually be of relatively short duration and high magnitude, and must be accommodated, if possible, in the ski binding system. However, if the same magnitude of force were to be applied for a greater duration, substantial injury could occur to the skier. On the other hand, substantially lower forces applied through longer periods of time, could also do substantial damage to the skier. Accordingly, although none of the state-of-the-art devices provides such a feature, it is desirable to have a ski release system which is actuated by certain predetermined forces which are operative on the ski and boot, but which takes into account the element of time, so that the ski boot is released only when the applied force presents a hazard to the skier.

BRIEF SUMMARY OF THE INVENTION

The invention is directed to an apparatus, which may be incorporated in a ski, ski boot or binding, for providing a measurement of the compressive and rotational forces which act on the binding and boot, thereby providing an output signal which, if it exceeds certain predetermined threshold levels for force and for torque, would initiate the operation of a release mechanism for releasing the ski binding, thereby to permit the ski to be separated from the binding, and to minimize injury to the skier during a fall. The apparatus incorporates, in a preferred embodiment, two distinct devices for taking into account the time duration of forces or torques acting on a ski and boot.

The invention also includes, in the preferred embodiment, a temperature compensation system, for compensating for changes in the ambient temperature, which can occur readily in the cold environments in which persons ski.

The invention utilizes electronic sensing means, such as transducers or other comparable sensing elements, mounted on or in the ski, binding, or the ski boot for sensing the forces acting upon the ski and boot. These sensing means, by their nature, are sensitive to very minor movements of the boot, on the order of 0.005", with respect to the ski, and, therefore, are operable without the necessity for the relatively substantial movements, on the order of one-half to three-quarters inch at the boot toe, required for the operation of the prior art devices. The utilization of such sensing means permits the invention to overcome substantially the effects of friction, which considerably restrict the utility of the purely mechanical prior art devices.

In a preferred embodiment of the invention, the bindings utilized in accordance with the invention may be mounted upon completely enclosed polymeric surfaces, protected from the environment and having low, uniform coefficients of friction, in order further to eliminate any effects of friction. Other embodiments provide for the incremental movement accompanying transducer response by including an elastomeric medium between the boot and ski to eliminate substantially completely the friction existing between moving surfaces.

The apparatus of the invention is supplied with electrical power from a suitable self-contained power source, such as batteries, which may be rechargeable from an electrical outlet, if desired. Other suitable power supply equipment, such as solar cell chargers, can also be utilized to maintain battery power. The mechanism of the invention, including the mountings for the strain monitoring elements, amplifiers and circuits for establishing minimum performance conditions, and the like, may be miniaturized through the use of low power integrated circuits so that the circuitry may be relatively conveniently formed in a thin package which may be mounted on or in the ski or binding, without interfering substantially with the functionality or convenience or use of the ski, or may be mounted in or on the ski boot, such as in a hollow heel of the ski boot.

An important aspect of the invention is the feature which provides for initiation of operation of the actuating means for releasing the ski boot only after a given force of relatively high value, such as 55 foot-pounds, has been in effect for a given period of time. For example, a skilled, aggressive skier, jumping, bouncing, and turning hard at high speed will exert high instantaneous, short-term torques far exceeding the normal ranges. Because of the viscoelasticity of human bones, dynamic torques, which exceed the static torque required to fracture a leg bone, may safely be endured for very short time periods. Therefore, the invention includes a time delay circuit to delay actuation of the release mechanism until such predetermined, high torques or forces have been applied for a predetermined period of time. It is also possible for damage to occur to a skier by having a substantial force or torque applied, of a lesser magnitude, but during a longer period of time, causing damage for different reasons. Therefore, a second circuit is included in the apparatus of the invention for operating the actuating means to release the binding after the lesser, predetermined force or torque has been in effect for a much longer, predetermined period of time, the acceptable values of force, torque and time depending on the skier's age, physical characteristics and ability.

The foregoing features of the invention provide a convenient apparatus for releasing a ski binding in dangerous conditions, which, because of the minimal few thousandths of an inch of movement required to trigger the release, substantially eliminates the effects of friction, and provides relatively instantaneous actuation of the binding releasing mechanism, upon occurrence of the dangerous condition. The device of the invention also more completely accommodates the variations in force and torque which are encountered in skiing. The mechanism, being electrically operated, may be finely controlled to set the predetermined release conditions, in accordance with the particular capabilities of the skier, and the particular conditions of skiing, to release the binding. The apparatus would normally be adjusted by professionals in a ski shop, but includes a means for pre-adjustments to ambient conditions or to suit the particular skier's technique, and provides two additional safety features to take into account the relatively instantaneous high forces which may be encountered without the necessity for releasing the binding and the substantially lower forces which may be encountered for more prolonged periods of time which would require release of the binding for the protection of the skier.

Other features of the invention include several release mechanisms which will release the binding very quickly upon being actuated by a suitable signal.

OBJECTS OF THE INVENTION

It is therefore an object of the invention to provide an apparatus for releasing a ski binding relatively instantaneously, accurately, reliably and effectively upon the occurrence of certain conditions of force or torque which might present a substantial danger to the skier.

Yet another object of the invention is to provide an apparatus for actuating a ski binding release which substantially avoids the effects of friction.

A further object of this invention is to provide an electronic ski binding release device which may accurately be adjusted to suit the particular skiing conditions and the capabilities of the individual skier.

A still further object of this invention is to provide a ski binding release apparatus which permits unusually high forces and torques to be withstood for relatively short periods of time without releasing the bindings, which will initiate release of the binding if such forces are applied continuously for a predetermined period of time.

An additional object of the invention is to provide a ski binding release apparatus which will release the binding if a relatively low force or torque is applied between the ski and the boot for a dangerously long, continuous period of time.

Yet another object of the invention is to provide a compact, reasonably priced, convenient, highly accurate and highly reliable mechanism for releasing ski bindings relatively instantaneously upon the sensing of a predetermined force or torque or combination thereof between the ski and ski boot.

DESCRIPTION OF THE DRAWINGS

FIG. 1 is a top plan view of a ski with a modified Spademan type of binding, showing one embodiment of the ski binding release mechanism of this invention, showing the released position of the binding clamp in phantom;

FIG. 2 is a cross-sectional view taken along line 2—2 of FIG. 1, showing a ski boot in phantom;

FIG. 3 is a cross-sectional view, taken along line 3—3 of FIG. 2;

FIG. 4 is a cross-sectional view, taken along line 4—4 of FIG. 3;

FIG. 5 is a cross-sectional view, taken along line 5—5 of FIG. 3;

FIG. 8 is a top plan view of another embodiment of this invention, utilizing a cable type release with the latch and toe piece assembly designed to accommodate the electronic release system;

FIG. 9 is a side elevational view of the embodiment of FIG. 8, showing the handle in the release position in phantom;

FIG. 10 is an enlarged cross-sectional view of the release mechanism of FIG. 8, taken along line 10—10;

FIG. 11 is a cross-sectional view taken along line 11—11 of FIG. 10;

FIG. 13 is a schematic representation of the preferred form of electrical system of the invention;

FIG. 19 is a circuit diagram showing how to utilize the electrical characteristics of a force switchable diode to produce the force and torque signals.

DETAILED DESCRIPTION OF THE INVENTION

Figure 6:
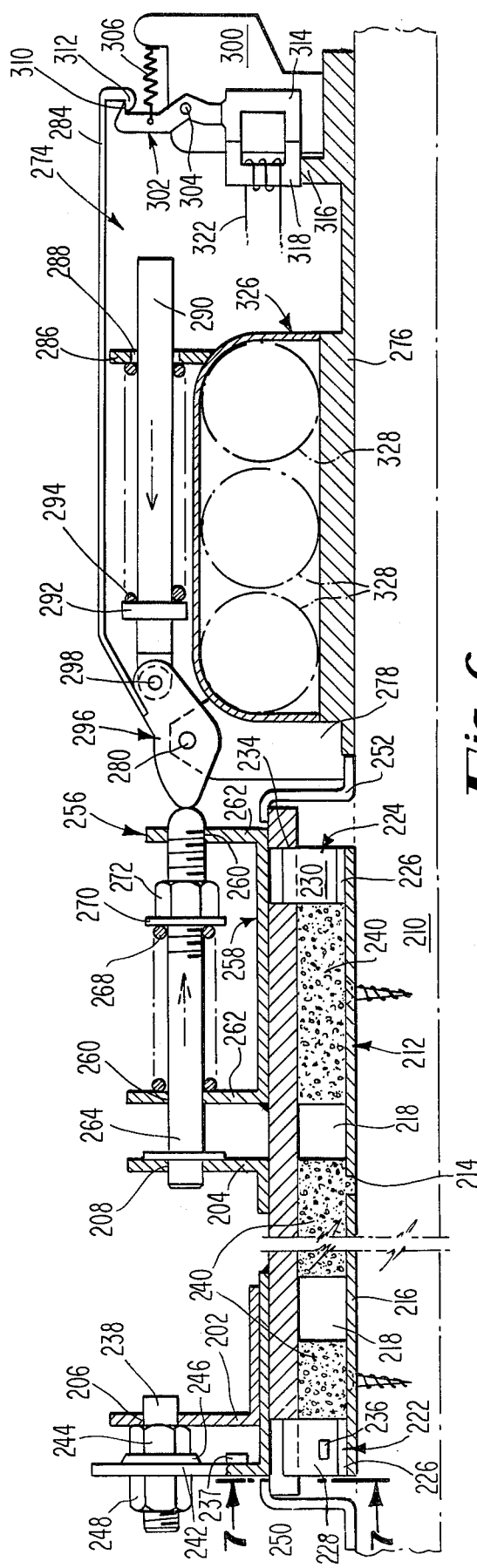
FIG. 6 is a cross-sectional view of yet another embodiment of this invention utilizing a heel and toe binding.

Viewing FIG. 1, numeral 50 designates a conventional ski, the length, width, thickness and material of which can vary substantially. The invention is applicable to skis of all sizes and types. Although only one ski is illustrated for each embodiment of this invention, the two skis of any pair will have identical bindings and release circuitry and devices. Mounted upon the ski 50 is a modified conventional type of binding, generally designated by numeral 60, and whose clamping mechanism is somewhat similar to a Spademan binding. The binding 60 is seen to comprise a pair of side clamping members 62, each of which has a horizontal portion 64 and a vertical portion 66. The vertically extending portion 66 has a lip section 68 which is adapted to overlie and grasp a boot plate which is securely fastened to the ski boot. Each horizontal portion 64 of the binding is formed with an angular groove 70, which acts as a cam follower, the function of which is discussed below. Each of the two members 62 is pivotally mounted about a pivot 72, which is fastened to the mounting plate 100.

Also slidably mounted on the mounting plate 100 is the slide member 76, which comprises an elongated shank 78 and terminates proximate its distal end in a pair of outwardly extending cam surfaces 80 and 82. Slide member 76 has a notched end 52, and the notch is engaged by a mating guide member 54 on the mounting plate 100 to insure the linear movement of slide member 76. Cam surfaces 80 and 82 are respectively capable of being seated in the notches 70 in member 62, in the manner illustrated, in an intermediate position of partial closure, in FIG. 1. Member 78 terminates at its proximal end in upstanding section 84 which is connected, by means, such as a roll pin 86, to spring bearing shaft 88 which terminates in enlarged end member 90. Compression spring 92 overlies shaft member 88 between the upstanding end member 102 formed on mounting plate 100 and end member 90 and presses cam follower 98 against the cam surface 108 of member 102, creating an upward force on shaft 88. A solenoid, generally designated by numeral 110, is mounted within protective enclosure 112 and has an actuating plunger 114 extending therefrom and engaging the end member 90 by being seated in aperture 94 therein.

The purpose of impact protector 112 is to cover the solenoid, and protect it from damage as a result of any impact or environmental conditions. The impact protector 112 may include a flexible boot 96 engaging plunger 114 to insure that the solenoid is protectively sealed from the elements.

Mounted on the base plates 116 and 140, which are fastened on ski 50, and free to rotate infinitesimally, is the binding plate member 100, the purpose of which is more fully described below. The binding plate member 100 is formed of aluminum material, and is formed, proximate its opposite ends, with depending sections 104 and 106. Base plate 140 is best seen in FIGS. 3 and 4 and is seen to be screwed to ski 50 by a pair of screws 150. The base plate 140 is formed with a tongue or lip 152 at its left hand end and the free end 154 of lip 152 is curved, as seen in FIG. 1. The base plate 140, including lip 152, is formed with a cut-out 156 along its longitudinal axis and a pair of opposed bearing surfaces 158 project inwardly from the opposite faces of that cut-out.

The binding plate 100, at the inner face of its depending section 106 is formed with a curved groove or platform 160 in which lip 152 is seated. Projecting inwardly from the base plate 100 at the center of the platform is a torque arm 162. Mounted on one vertical face of torque arm 162, spaced considerably forward of bearing surfaces 158 is a strain gauge 164, which is fastened by the use of an epoxy adhesive or other suitable fastening means.

Base plate 116 is generally similar in size and shape to base plate 140 and has a raised, rearwardly projecting lip 118. However, in contrast to base plate 140, lip 118 is continuous. Lip 118 is curved, as seen in FIG. 1, and is seated in a mating cut-out 170, which is located in the forward end of section 104. Suitable restraint (to prevent disengagement of lip 118 and cut out 170) is provided by side tabs or a pin through 118, 170 and 104 such that torque is monitored by the forward load on torque arm 162.

It is important to note that the only mounting for binding plate 100 is the base plates 116 and 140, which support the binding plate 100 in such a manner that its lower face, at the bases of dependent sections 104 and 106, is spaced from the ski 50. Thus, all bearing forces acting upon the binding plate are transmitted to base plates 116 and 140.

Because of the construction of the forward binding plate section 106 and base plate 140, any torsional forces are sensed by the strain gauge 164, in the manner more fully described below. The leads from strain gauge 164, which are designated by numeral 174, and which extend through aperture 176 in the binding plate, are connected to the electronic circuitry located in compartment 120. Formed in binding plate 100 is compartment 120 which has removable cover 122. The leads 174 extend into compartment 120, in which compartment the power source and electronic circuitry to release the binding are located. Other leads (not shown) extend from the compartment 120 rearwardly to the solenoid 110, in any desired manner in which the leads are protected from being broken or frayed. Mounted atop binding plate member 100, as by adhesive, are two pressure sensitive members 124 and 126, which may be pressure transducers or other similar functioning mechanisms, more fully described below, for the purpose of measuring the downward forces impressed thereon.

It is to be noted that base plate 140 serves three purposes: 1) To limit rotation of the binding plate 100 to a few thousandths of an inch, 2) to load the cantilever beam 162, which is an integral part of the binding plate 100 by means of load bearing surface 158, and 3) to provide the male bearing support which constrains the binding plate 100 to rotate with respect to the base plate 140. The strain gauge 164 is attached to the cantilever beam 162 near its fixed end, to obtain maximum sensitivity. Since the cantilevered beam 162 is constrained in sideward movement by load plate 140 the torsional load applied by rotation of the binding plate 100 is directly monitored by the strain gauge 164.

The torque sensing feature of the invention operates in the following manner. Because of the curved tongue and roove relationship between lip 152 of base plate 140 and platform 160 of binding plate 100, and because the binding plate 100 is spaced above the ski 50 (as seen in FIGS. 4 and 5), binding plate 100 will tend to rotate upon the application of any torque to the ski boot, which is clamped to the binding plate 100. However, the cantilevered torque arm 162, which is seated in cut-out 156, is restrained from movement by bearing surfaces 158 in the base plate 140. Therefore, the bearing surfaces 158 prevent any significant rotation of the binding plate 100 and concentrate torque forces in torque arm 162. These forces are also experienced by transducer 164, which is rigidly mounted on torque arm 162, and therefore produces a signal which is relatively contemporaneous with any substantial torque imposed on the ski boot and which is proportional to the magnitude of the torque.

A schematic representation of the functioning of the apparatus of the invention is illustrated in FIG. 13. Numeral 1 designates a force to voltage transducer, or other electronic component for the purpose of converting variations in force acting upon the ski or ski boot to a representative voltage. One such type of transducer could function in a linear fashion to produce an output corresponding linearly to the forces imposed on the transducer. In the embodiment illustrated in FIGS. 1 to 5, three separate forces to voltage transducers could be utilized on each binding, two transducers for measuring compressive forces, located at 124 and 126, and one transducer 164 for measuring torque. Therefore, three separate voltage outputs would be produced in the example given, although commercial units may use only one force and one torque transducer, if desired. For a good skier, it would normally only be necessary to have a force measuring device such as transducer 124, at the front of the ski binding to measure the force resulting from a forward fall. Forward falls are the primary cause of problems with good skiers. However, inexpert skiers can often have backward falls, and it may be desirable, for such skiers, to have a force monitoring means on the rear end of the binding, such as transducer 126, to measure forces occurring from backward falls. Since each of these voltages is relatively small, it would first be amplified to be more readily ascertained by a suitable voltage or current amplifier, designated by numeral 2. The output of these amplifiers is fed into a summing amplifier 3 and then the summed signal fed into both a force times time detector, and variable impact time delay designated by numerals 5 and 4. Either or both of the signals from the force times time detector 5 and the impact delay 4 are fed through "or" gate into variable threshold detector 7. The variable threshold detector would be a suitable device, more fully described below, for producing an output signal when the voltage or current input thereto exceeds a predetermined value. Therefore, when the force or torque or the sum of the two on the force and torque to voltage transducers exceeds the predetermined value, the variable threshold detector would be actuated and would produce an output signal to the electronic switch 8 which will actuate electrical actuator 10.

The variable impact time delay, designated by numeral 4, is a device, more fully described below, the purpose of which is to provide for a time delay before providing an output signal, when the force and torque signals or the sum of the two exceeds the predetermined quantity at which the threshold detector should be actuated. The purpose of the variable time delay is to avoid instantaneous actuation of the ski release when the forces being measured exceed the predetermined limits for very short intervals of time. For example, an accomplished skier during the course of certain turns, bends, jumps, and the like, may wind up imposing very substantial impact forces on the skis which are of a magnitude that, if the forces were applied continuously for a given period of time, would be dangerous to the skier, but when applied for a shorter period of time, should not actuate the release mechanism. Therefore, the variable time delay allows a variable, preset time lag to be set in the mechanism for each skier, to prevent premature release of the binding even though the predetermined threshold of safety has been exceeded.

The force times time detector 5 provides the arithmetic product of force and/or torque and time, so that forces, which may be of a lesser magnitude than would normally be harmful, but are applied for excessively long periods of time and therefore are potentially harmful, would be measured and would, if of sufficient magnitude, produce an output signal which would actuate the release mechanism.

It is to be noted that the threshold detector 7, impact time delay 4, and force times time detector 5 are variable, and are provided with suitable adjusting means that their threshold actuating conditions may be varied, in accordance with the skill of the skier utilizing them or in accordance with the circumstances under which the skier is skiing. For example, it is obvious that a skilled skier will better be able to withstand substantially higher forces and torques during normal skiing than will a novice. Accordingly, the actuating level of the variable threshold detector 7 would be set for actuation at substantially higher levels for the skilled skiers than for novices. For the same reasons, the force times time detector will be adjustable to accommodate the particular capabilities of the person utilizing the ski mechanism.

The output signals of the variable time delay unit 4 and the force times time detector 5 are fed into an "OR" gate 6, which is actuated by either or both of the two signals, for the purpose of actuating the threshold detector 7. Electronic switch 8, when closed by a suitable output signal from the threshold detector 7, initiates the operation of a suitable electronic actuator 10, such as a solenoid, which operates the mechanical release mechanism for releasing the ski bindings. The entire system is provided with power from a suitable power source, generally indicated by numeral 9, which may be a battery or other suitable small size power source, which may be contained in the compartment 120 or in a similar compartment in or on the ski or the ski boot. The power source would include a battery condition indicator 12, which would indicate the condition of the battery so that adequate warning would be provided if battery voltage fell below an acceptable value, and one embodiment of the invention could, if desired, use a solar cell charger 11 for the purpose of using solar energy for energizing the power source.

It is to be noted that a variety of types of adjusting means can be utilized to adjust the variable actuating levels of the force times time detector 5, the variable impact time delay 4 and the variable threshold detector 7. These could be dials, easily visible on the upper surface of the ski, and provided with a plurality of incremental settings indicating the capability of the skier, such as novice, beginner, intermediate, expert, racer and the like, or can be provided with suitable numerical designations, representative of the capability of the skier and/or of other conditions. Alternatively, an actuating device, may be mounted in a suitable aperture in the ski or on the ski, for being actuated by a suitably conforming wrench or screw-driver head, for adjusting the variable quantities.

It is to be noted that, in order to conserve power, an appropriate switch (not shown) for turning on and off the power source for operating the electrical components of the system may be included in the invention device, to be turned "on" only at the commencement of a ski run and to be turned "off" at its conclusion.

In operation, the apparatus of FIGS. 1 to 5 would normally, in the disengaged condition, be in a position where the actuating member 88 is in a substantially vertical position. In this position, the cam member 76 is in the extreme left hand position of its movement, and the clamps 62 extend outwardly, as seen in phantom in FIG. 1, so that a ski boot and boot plate can be inserted between the clamps. The skier would then step onto the ski, and push backwardly and downwardly to move actuating member 88 to the locked position shown in FIGS. 1 and 2. The cam follower 98, which is biased by spring 92 would follow the cam surface 108 of member 102 as the cam actuating member 76 is pulled to the right (viewing FIGS. 1 and 2). As this occurs, cam members 80 and 82 engage the corresponding female sections 70 of the clamping member 62 to draw these inwardly, whereby the clamp section 66 engages the boot plate (Not shown in FIG. 2), which is attached rigidly to the sole of the ski boot. When the actuating member 88 is in the horizontal position illustrated, the spring-loaded locking rod 114 of solenoid 110 engages the mating aperture in member 90, to lock the binding to the ski-boot plate. The ski boot is thereby rigidly locked to the ski for normal skiing activity.

In the normal skiing circumstances, the forces between the ski and ski boot will stress the transducers 124, 126 and 164 to produce output voltages which are fed into the voltage or current amplifiers 2 into the summing amplifer 3, into the impact time delay 4 and force times time detector 5. So long as the output voltages produced do not exceed the predetermined amounts established by the settings of the variable threshold detector 7, nothing further will happen.

However, as soon as such a condition exists that an unusual force is imposed on either of the compression measuring transducers 124 and 126 or the torque measuring transducer 164, either in terms of the magnitude of the force or the force times time characteristics of the force, the "OR" gate will pass the signals to the input of the threshold detector 7 and an appropriate output signal will be produced by the variable threshold detector 7 to initiate the closing of the electronic switch and actuate the electronic actuator, which in the embodiment illustrated is the solenoid 110. The solenoid 110, when actuated, moves the engaging member 114 to the right, thereby disengaging the actuating member 88. The force of spring 92, forces the cam follower 98 against cam surface 108 and the curvature of the cam surface is such that the spring force drives the cam follower upwardly along the cam surface. As this occurs, the slide member 76 is driven in the left-hand direction (viewing FIGS. 1 and 2), whereby cam members 80 and 82 force outwardly the respective follower sections 70, thereby to release the binding to free the boot from the ski and prevent any injury due to the skier's leg being rigidly fastened to the ski. Because of the substantial spring force of spring 92, which is aided by the torque supplied by the boot and the skier's leg, this release occurs extremely rapidly, to allow the ski boot to be released a minimal period after the dangerous force is sensed by one of the transducers.

It is to be noted that the usual Spademan binding has a sharp change in the cam surface corresponding to cam surface 108, the latter being uniformly curved as illustrated. Thus, in the prior Spademan type of binding it is necessary to move the clamps 62 outwardly by a toe displacement of approximately one inch, to displace slide 76 and move cam follower 98 upwardly to a point where the spring action or the cam follower will cause the cam follower to follow the cam surface the remainder of the way to complete the outward displacement of the clamps. However, the modified Spademan type binding disclosed herein utilizes a completely curved cam surface 108, so that the cam follower 98 is released as soon as solenoid 110 is actuated to displace latch member 114. Since the solenoid is actuated by a relatively instantaneous signal from the force sensing circuitry, this characteristic allows the ski boot to be unclamped immediately after a dangerous force is sensed by the force sensing circuitry, without requiring any substantial displacement of the clamp member 62.

It is to be noted that, although a solenoid is illustrated as the mechanism utilized to release the ski binding, this may prove impractical because the "freezing" effect of moisture, snow, dirt and the like might require an extremely powerful (and therefore large) solenoid to overcome the "freezing" action. Therefore, it may be desired to substitute other types of release mechanisms, some of which are described below, for the solenoid. The use of any type of quick response, electrically actuated release mechanism, which is preferably light, compact, reliable, and not affected by skiing conditions, is within the purview of this invention.

Figure 7:
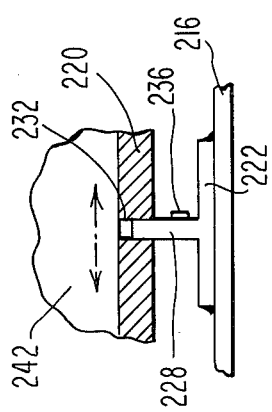
FIG. 7 is a partial front elevational view, taken along line 7—7 of FIG. 6.

FIGS. 6 and 7 illustrate an alternative embodiment of the invention, utilized in connection with a conventional type of heel and toe stud mounting for engaging the ski boot. These figures also illustrate another type of release mechanism for releasing the ski binding. In this embodiment, the ski boot is provided with a toe plate 202 and a heel plate 204 provided with respective aperatures 206 and 208. The toe plate 202 and heel plate 204 are each rigidly fastened to the ski boot (not shown) in a manner which is well known. Mounted on ski 210 is a ski mounting plate 212, which is composed of a plurality of sections 216, separated by small spaces, such as 214, in order to allow the ski to flex during use. Mounted upon the mounting plate 212, as by welding, are two or more support plate members 218 which are upstanding, and which serve to support the torque plate 220. Mounted at the front and rear end of the mounting plates are inverted T-shaped members 222 and 224, which are fastened at their horizontal webs 226 to mounting plate 212, as by welding. The vertical webs 228 and 230 of members 222 and 224 are seated in mating apertures 232 and 234 in torque plate 220. As best seen in FIG. 7, there is a space between the top of webs 228 and 230 and torque plate 220 to permit the torque plate to bend downwardly. It is to be noted that T-member 224 is shaped the same as member 222 and seats in the slot in torque plate 220 in the same manner as shown in FIG. 7.

Each of the support members 218 is coated on its upper surface with a low friction material, such as polytetrafluoroethylene, in order to reduce friction between the support plates and the lower, adjacent surfaces of torque plates 220. Between the respective support members and inverted-T members is a filler material 240, the purpose of which is to secure the torque plate 220 to the mounting plate 212, by being fastened to both of said plates, such as by the use of a suitable bonding or adhesive, while allowing sufficient flexibility between the torque plate and the ski mounting plate 212 to permit torque to be transmitted to the inverted-T members or torque beams 222 and 224. The filler material, when bonded to the torque plate 220 and to the mounting plate 212, is similar in action to a torsion spring mounting and may be used without support members 218 if its spring rate is sufficient to support the skier's weight under all conditions. The filler material is desirably an elastomer, such as a slightly resilient semi-rigid polyurethane foam, which is waterproof, resilient, and has good adhesive qualities. Inherent in the design utilizing a filler material is the lack of friction and complete control over the sliding surfaces, since no foreign material is able to enter the mating surfaces. A suitable strain gauge or other strain measuring device 236, such as transducers or other devices more fully described below, is mounted on the upstanding web of the torque beam 222, as by the use of a suitable adhesive.

Fastened on the torque plate 220, as by being welded thereto, is toe engaging plate 242, which is L-shaped. Mounted on the upstanding portion of member 242 is the toe plate stud 244 which engages the toe plate 202 by extending through the aperture 206. The toe plate stud 244 is mounted, such as by the use of Bellville springs 246 and nut 248, in a manner which is well-known in the art, to reduce the shock load of forward impact, and to allow for a change of length between the heel and toe as the ski flexes. The toe plate stud 244 can also be made of such material and characteristics as to be able to shear in the event of an electrical failure and unusually high torque upon the boot, as an additional safety factor. Also mounted on the vertical web of the toe engaging plate, below stud 238, is strain gauge 237 to monitor forward forces.

Mounted to the ski, as by bolts or screws, at either end is a Z-shaped clamp, respectively designated 250 and 252, which overlie and hold in place the respective forward and rear ends of torque plate 220 to prevent the torque plate from separating from elastomer 240.

Mounted on the rear section of the torque plate 220, as by welding, is the heel engaging mechanism, generally designated by numeral 256, which comprises an upstanding, U-shaped plate 258, provided with horizontal apertures 260 in its two vertical members 262 which permit the passage of the circular cross-section, horizontally extending heel plate stud 264. Stud 264 is spring loaded, by means of compression spring 268, which bears against collar 270, mounted on stud 264 by adjustable nut 272, and bearing against the left-hand upstanding portion 262 of the heel mounting plate. Compression spring 268 biases the heel plate stud 264 in a direction (to the right, viewing FIG. 6) such that it is biased to disengage from the heel plate.

Also viewing FIG. 6, there is mounted on the ski, behind the torque plate 220, an actuating unit, generally designated by numeral 274, including a base member 276, which is suitably mounted to the ski, and including a pair of upstanding support members 278 between which there is pivotally mounted, on pin 280, the cam (heel plate stud engaging and release member) 296. The cam member 296 is fastened, as by welding, to handle 284. Below the handle and fixed to the base 276 is a depending guide member 286 having an aperture 288 through which the spring mounting member 290 extends. Mounted on spring mounting member 290, approximate its left-hand end, is an adjustable nut 292, which is threaded thereon, and which bears against the compression spring 294, the force of which is adjustable by adjusting the position of nut 292 on member 290. The left-hand end of member 290 is pivotally mounted to cam member 296 by means of a suitable mounting pin 298.

Mounted at the rear of the actuating member 274, and fastened to base plate 276 is support member 300, upon which is mounted latch 302. Latch 302 is pivotally mounted to support member 300 at pivot point 304, and is loaded by means of tension spring 306, one end of which is fastened to latch 302 and the other end of which is fastened to support member 300. Latch member 302 has engaging portion 310 which is adapted to overlie and engage the mating projection 312 at the right-hand end of handle member 284.

Fastened, as by welding, to the bottom end of latch member 302 is a permanent horseshoe magnet 314. Mounted on stand 316, which is rigidly fastened to base 276, is a second horseshoe-shaped electromagnet 318, the poles of which are located so that the positive pole of electromagnet 318 is opposite the negative pole of magnet 314, and the negative pole of electromagnet 318 is opposite the positive pole of magnet 314. Electromagnet 318 is rigidly mounted on stand 316, which is fastened to the base 276.

Wound around the core of electromagnet 318 is a coil of electrical wire 322 which is connected to the electronic switch 8, in the manner shown in FIG. 13. Thus, in the normal latched condition shown in FIG. 6, when coil 322 is deenergized, the permanent magnet 314 retains the handle 284 in the latched condition. However, when the coil 322 is energized to activate the electromagnet 318, the resulting negative pole of electromagnet 318 is opposite the negative pole of permanent magnet 314, and the positive poles of the two magnets are also opposite each other. The repulsion between the aligned poles of the same polarity displaces the magnet 314 in the counterclockwise direction, rotating latch member 302 against the force of tension spring 306, which normally biases the latch in the clockwise direction, and releasing handle 284.

In compartment 326, mounted on plate 276, are power cells for operating the electrical devices of the invention, and the electrical components (not shown), formed in micro miniature circuit elements, are also mounted in compartment 326. Leads (not shown) from the strain gauge 236 and extending to compartment 326, may be mounted, in a protected manner on the ski.

In operation, the handle 284 normally extends vertically and is biased by compression spring 294 to a position where the handle extends vertically, in which instance the heel plate stud actuating end of cam 296 is in a downwardly extending position. In this position (viewing FIG. 6), the heel plate stud 264 is biased to the right by spring 268, so that the stud is disengaged from aperture 208 in the heel plate 204. This is the normal condition of the binding before insertion of a ski boot. In this condition, the skier would place his boot upon the ski and move it forward, so that toe stud 238 engages toe plate 202 through aperture 206. The ski boot is moved as far forward as possible, and the locking handle 284 is then pushed downwardly to the horizontal position shown in FIG. 6 whereby the right-hand end 312 of the handle is engaged by the lip 310 of spring biased latch member 302. In this position, the tension spring 306 is in a stressed condition, and the poles of magnet 314 are attracted to the inactive poles of deenergized electromagnet 318, which is formed of highly permeable ferrous metal, and the latch member 302 is therefore maintained in the locking position. As the handle 284 is moved downwardly from the vertical position, cam member 296 rotates in a clockwise direction about pivot 280 so that the heel plate stud engaging surface of the cam member engages the right-hand end of the heel plate stud 264 and drives it, in a left-hand direction (viewing FIG. 6), so that the stud 264 engages aperture 208 in the heel plate 204, in the manner shown in FIG. 6, thereby locking the ski boot securely to the ski.

When the actuating arm 284 is in the position shown in FIG. 6, it is locked in place by latch member 302. It remains in this position until the electromagnet 318 is energized by a suitable signal from the electronic switch as a result of a dangerous force condition being sensed by one or two of the strain gauges 236 and 237. Strain gauge 237 will sense forces created by the forward thrust of the ski boot. If substantial forward forces act on the vertical web of toe engaging plate 242, the lower web of which is rigidly fixed to torque plate 220, the vertical web will be stressed and the stress will be sensed by the strain gauge 237 mounted thereon. If the boot is twisting, it will tend to twist the torsion plate 220, which will slightly bend vertical web 228, to the left or right, thereby stressing the web and the strain gauge mounted thereon, producing a signal corresponding to the imposed torque.

If the magnitude of the signal from either transducer (shown as a strain gauge in FIG. 6) exceeds the predetermined magnitude established by the variable threshold detector 7 and variable impact time delay 4 of the electronic circuitry, or the force times time detector 5, the electronic switch 8 is closed and the coil 322 of electromagnet 318 is energized, to activate its poles and thereby to displace latch member 302 in a counterclockwise direction, overcoming the restraining force of spring 306 and releasing the retaining finger 312 of handle 284. This signal, processed in the manner described above, will trigger the release mechanism when all of the predetermined time intervals and magnitudes of the release circuitry are satisfied. Spring 294 then acts to rotate the cam member 296 and the unrestrained actuating arm 284, which is rigidly attached to the cam member, in a counterclockwise direction. When this occurs, the engaging face of cam member 296 which held the heel plate stud 264 in the locking position, is rotated about ninety degrees, out of the mating position, so that handle 284 is approximately vertical thereby allowing spring 268, bearing against retaining member 272, which is rigidly fastened to the heel plate stud 264, to drive the heel plate stud in the right-hand direction (viewing FIG. 6), thereby releasing the engagement between the heel plate stud and the heel plate, and allowing the ski freely to fall away from the ski boot, since there is nothing holding the toe plate stud in the aperture in the toe plate 202.

It is to be noted that the forward force monitoring gauge 237 will measure any substantial forward forces, as when the ski or boot impacts with a deep impression in the snow, a tree, rocks or snow bank, thereby bending the vertical face of plate 242 and imposing substantial strain on the strain gauge 237.

FIGS. 8 to 11 inclusive illustrate yet another embodiment of the invention wherein the ski 350 has a cable-type of binding, wherein the toe plate 352 is engaged by a suitable toe plate stud 354, and the heel of the boot is engaged by a suitable well-known cable mechanism 358. The cable 362 is tensioned by a suitable cable tension spring 364, and the cable length is adjustable in a manner which is well-known in the art, by means of movement of cable length adjusting nut 366. The cable is a flexible spring-like but non-elongatable rod. The cable is guided on either side of the ski under suitable well-known cable guide means, 368, and the cable has a rearward end 370, which when latched to the boot extends upwardly at an angle from the ski, and is provided with a plastic cable cover type heel engaging section 372, as best seen in FIGS. 8 and 9. Cable connector 362 is fastened to yoke 388 which is pivotally connected, by pins 390 to the sides 392 of actuating arm 286. Actuating arm is pivotally fastened by pins 394 to the vertical sides of base plate 396, which is fastened to ski 350.

The stud retaining plate 376 is L-shaped in cross-section, and is fastened to the ski base plate 378, and secured thereto as by welding. Plate 378 is screwed to the ski by means of suitable screws. The toe engaging stud 354 is of a conventional type of construction and engages the toe plate 352 by extending through a tapered aperture therein. Mounted, as by an adhesive, on the side of the toe engaging stud 354 is a transducer type of strain gauge 380 the purpose of which is to measure the amount of torque applied at the front of the boot to the stud 354. Mounted on the underface of bracket 376 and extending beyond base plate 378 is a strain gauge 382, mounted as by a suitable adhesive, for the purpose of measuring downward forces.

The cable 362 is adjusted from a loose-fitting position, wherein the boot may be inserted or removed, to a position where the heel engaging portion 370 tightly engages the heel of the boot by applying tension to the cable with a counter-clockwise downward force on actuating arm 386, from the position shown in phantom in FIG. 9.

The locking mechanism functions in the following manner. The actuating arm is initially in the position shown in phantom in FIG. 9, in which the cable 362 is released and a boot may be inserted inside the heel engaging end 370 of the cable, with the toe plate 352 engaging the toe engaging stud 354 and limited in travel by stop 500. The actuating arm 386 is then moved in a counterclockwise position whereby the cable 362 is advanced to the left, the heel engaging portion 370 thereby tightly engaging the heel of the ski boot, rigidly to affix it to the ski.

The actuating arm is then locked in place by the locking mechanism of latching lever 398 engaging hook member 400 of the actuating arm 386. The latching lever 398 is pivotally mounted to the vertical sides of the base plate 396 and is held in the latched position against vibration by the action of torsion spring 402, which is mounted on one of the posts upon which the latching lever is mounted.

Mounted within the enclosure formed by actuating arm 386 and base plate 396 is a cartridge actuating mechanism. This mechanism comprises a removable cartridge case 404 which is insertable through a suitable aperture in one of the walls 392 of the handle and 396 of the base plate. A plurality of cartridges 416 may be inserted in the case, which contains compression spring 406 to bias the cartridges to a dispensing position. The section of cartridge case 404 opposite the lower end 408 of latch mechanism 398 has an opening 410 in alignment with the lower end, so that the impact of an exploding cartridge at the opening 410 will act upon the adjacent end face of the lower end 408 of the latch mechanism, relatively instantaneously to displace the latch mechanism in the clockwise direction against the restaining force of torsion spring 402. This displacement of latch mechanism 398 releases hook member 400 and allows the actuating arm 386 to be released under the tensile force of cable 362 (since its line of action produces a clockwise torque about pivot point 394), thereby relieving the tension in the cable and releasing the heel retaining section 370 of the cable. When the heel is released, the ski boot can fall free from the boot since the toe plate 352 is no longer forced into contact with toe engaging stud 354.

The cartridge opposite the lower end of latch 398 is exploded electrically by means of a pulse of current through a pair of contacts (not shown) in cartridge case 404. The contacts are provided with current from a suitable power source located in enclosure 412, mounted on base plate 396, when commanded by the electronics because of excessive force or torque at the appropriate transducer. The electronic circuitry to sense the signals from the strain gauges 380 and 382 and produce the actuating current for the cartridge may also be located in enclosure 412.

The cartridges 416 are special cartridges made to produce a controlled explosion adequate to displace latch 398 without creating any unnecessary explosive forces or hazards.

Strain gauge 380 will sense forward forces of the ski boot as well as torsional forces which slightly bend stud 354 and thus stress the strain gauge 380 proportional to the imposed torque. Strain gauge 382 will sense and produce a signal corresponding to any downward forces of the ski boot against the stud retaining plate 376. These signals, through leads (not shown) from the strain gauges to the electronic circuitry in compartment 412 will produce the current to actuate a cartridge 416 if the force sensed is of sufficient magnitude or duration, or both.

Ejection of the spent cartridges is achieved by the ejection mechanism 420. This mechanism comprises an ejection plunger 422, which is pivotally mounted at one end to link member 424 and extends into the cartridge case, at the other end, through aperture 426. Link member 424 is pivotally mounted on base 396 by pivot pin 428 and ejection lever 430 is rigidly affixed thereto. The ejection lever extends through a suitable aperture at the base of the side wall 392, which aperture extends to the bottom of the side wall so that the handle can be raised without disturbing the ejection lever.

Ejection of a cartridge is achieved when the actuating arm 386 is in the unlatched position by pushing actuating lever 430 inwardly, rotating link 424 and displacing ejection plunger to the left (viewing FIG. 11). This displaces the spent cartridge to the left, through aperture 410 in the cartridge case, displacing latching member 398 in the clockwise direction so that the cartridge can be released. When the actuating lever 430 is retracted and plunger 422 is withdrawn, spring 406 displaces the cartridges so that a new cartridge occupies the position formerly occupied by the spent cartridge.

Once all of the cartridges in case 404 have been used, the case can be removed, refilled and reinserted or a new, filled case inserted.

Mounted on the ski 350 is a control box 418, having a removable cover to provide access to the dials 431. The dials are connected to the electronic controls and may be adjusted to set the predetermined, variable forces and times which establish the conditions for releasing the ski binding. The dials may, as illustrated be adjusted by the use of a screwdriver, or by any other well known means, such as a wrench, preferably in the ski shop, and locked in place. The particular descriptive designations for the dial settings, whether numerals or noun designations, such as "beginner", "novice" or "expert", may be selected in any desired manner without departing from the principles of this invention. An "on-off" switch for the power supply may also be located in compartment 418. During skiing, the cover of the compartment would desirably be in place to prevent inadvertent displacement of the dials.

Figure 12:
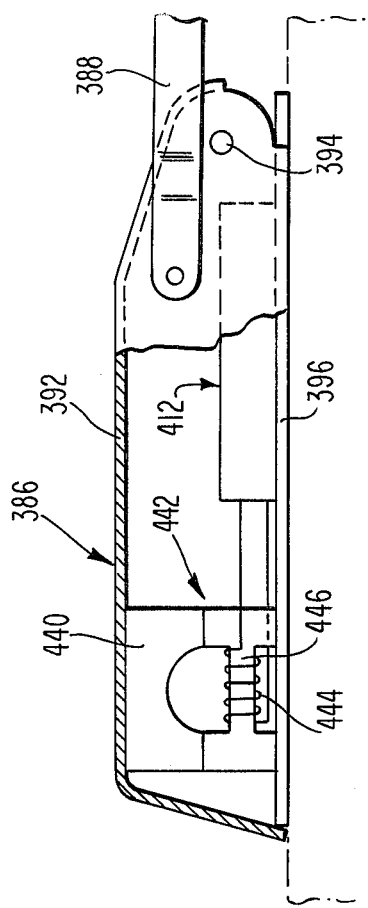
FIG. 12 is a partial cross-sectional view, showing yet another embodiment of the release mechanism, utilizing an electromagnet.

In the embodiment of FIG. 12, the ski is latched to the boot in the same manner as illustrated in FIGS. 8 and 9; however, in this embodiment the actuating lever 386 is held in the closed position with the retaining force of permanent magnet 440 to the highly permeable ferrous electromagnet 442.

The latching mechanism of FIG. 12 is the same type of mechanism as in FIG. 6. Permanent magnet 440 is fixed to actuating member 386 and H-shaped electromagnet 442 is fixed to base 396. Coils of wire 444 are wound around electromagnet core 446. The coils are connected to the electronic circuitry in housing 412, so that they may be used to energize the core 446 when the electronic switch 8 of FIG. 13 is closed. In the unenergized condition, the poles of magnet 440 are attracted to the ferrous material of electromagnet 442, so that the actuating arm is locked in position when lowered to the position of FIG. 12. When the coil 444 is energized in response to an emergency condition sensed by the electronic circuitry, the poles of electromagnet 442 become activated with a polarity such that the two magnets 440 and 442 repel each other and the actuating arm 386 is thereby released and is lifted to the release position by the tension on the binding cable, in the manner described above with respect to FIGS. 8 and 9.

FIGS. 14 to 19 inclusive illustrate several different types of electronic circuitry and sensing means which may be used in the practice of this invention for sensing a linear force or torque acting on a ski boot and producing a signal to initiate the operation of an actuating means to release the ski binding, when certain predetermined conditions of force and time have been met. It will be appreciated that each of the circuits corresponds to the schematic diagram illustrated in FIG. 13, and that numerous other types of sensing means and circuit configurations can be utilized without departing from the teachings of this invention.

Figure 14:
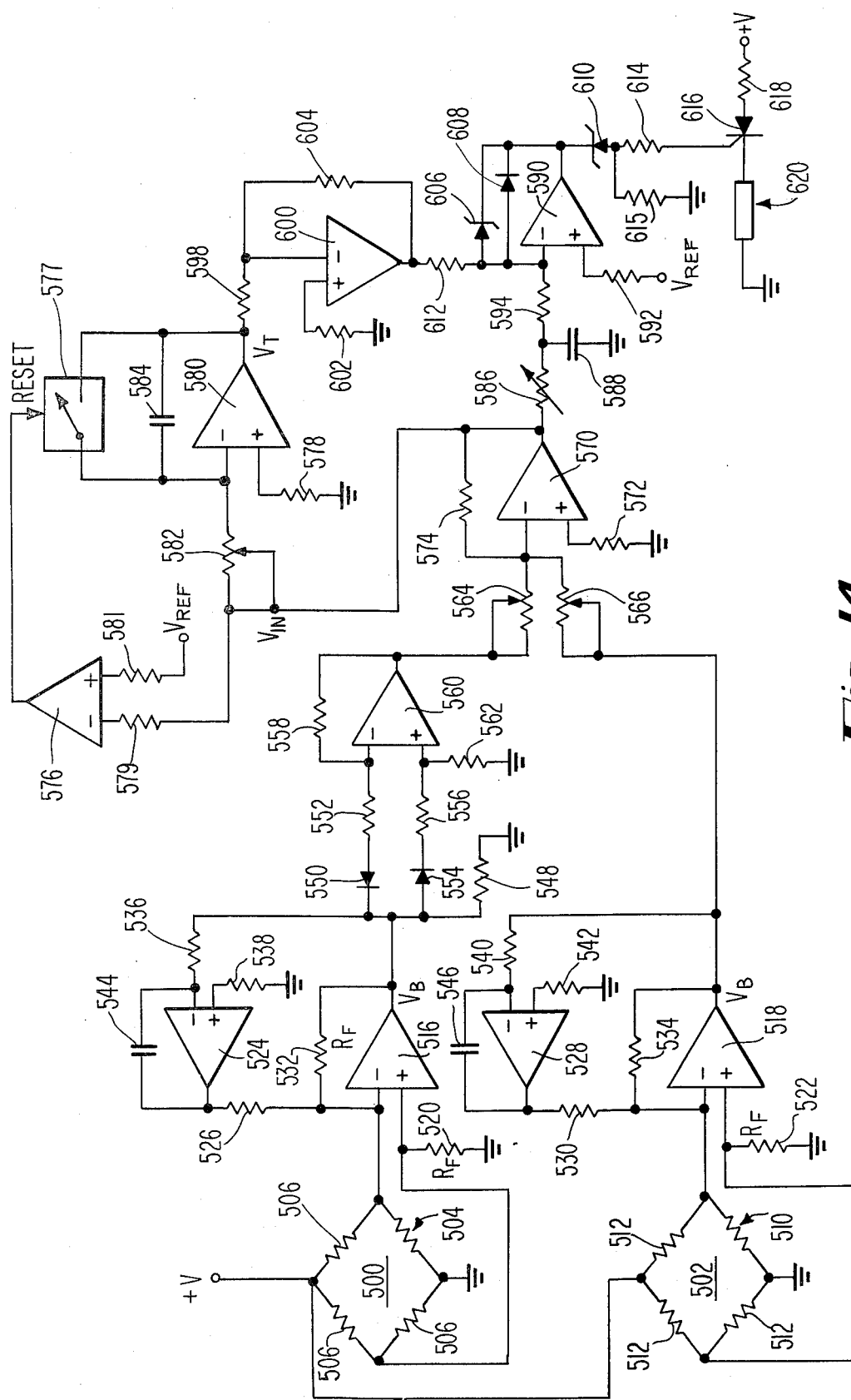
FIG. 14 is a circuit diagram showing one embodiment of the electrical circuit of the invention, utilizing integrators for temperature compensation and strain gauges and unbalanced bridge circuits to signal force and torque.

FIG. 14 illustrates a force sensing circuit in which two strain gauges are utilized. Strain gauge 510 which is a transducer, is utilized to measure compressive forces, and strain gauge 504, which is also a transducer, is utilized to measure torque. Each strain gauge is connected to an arm of a normally balanced bridge circuit, respectively generally designated by numerals 500 and 502. Each of the bridges 500 and 502 comprises three fixed resistances, respectively designated 506 and 512. The resistances of resistors 506 and of strain gauge 504 in the unstressed condition are the same, so that bridge 500 is normally balanced. The resistances of resistors 512 and of strain gauge 510 in the unstressed condition are the same, so that bridge 502 is normally balanced.

In the embodiment of FIG. 14, the strain gauges 504 and 510 are desirably transducers of the foil or semiconductor type although, as more fully described below, other types of transducer mechanisms and/or circuits to perform the equivalent functions may be utilized without departing from the spirit and scope of the invention.

Bridge circuit 500 is utilized to measure torque and bridge circuit 502 is used to measure compressive force. Each strain gauge, when subjected to a compressing or tensile force, changes in resistance in proportion to the force applied, the resistance decreasing with compression of the strain gauge and increasing with tension of the strain gauge. Thus, when either of strain gauges 504 or 510 is stressed, its resistance will decrease or increase accordingly, thereby imbalancing its normally balanced bridge circuit and producing an output voltage corresponding to the stress experienced by the strain gauge. In the torque bridge circuit 500 the torque output signal can take on a positive or negative value, depending upon the direction of the torque applied. In bridge circuit 502 the force output will take on one polarity only, corresponding to the forward compressive force.

Each of the bridge circuits 500 and 502 is connected to a corresponding differential amplifier, respectively designated 516 and 518, for the purpose of amplifying the relatively small signals from the bridge circuits. These amplifiers are utilized to amplify any imbalance in each bridge circuit due to changes in strain gauge resistance, as the stresses on the corresponding strain gauges are developed.

Connected to each of the amplifiers 516 and 518 is a slow integrating amplifier, respectively designated 524 and 528, the purpose of which is to provide a long-term closed loop control, designed to hold the torque voltage and force voltage at zero in spite of the fact that either or both of the respective bridge circuits 500 and 502 may experience a small imbalance due to temperature changes or drift in circuit components. Since the integration time constants of amplifiers 524 and 528 are very substantial (on the order of a few minutes) there will be no effect produced by these amplifiers on the relatively instantaneous forces developed and sensed by strain gauges 504 and 510, to which the binding release system is intended to respond. The integration time constants are proportional to the values of capacitor 544 and resistor 536 and capacitor 546 and resistor 540 on amplifiers 524 and 528 respectively. Resistors 526 and 530 determine the closed loop gain of the integrator signals, and if properly chosen will yield an optimum closed loop response. Resistors 532 and 534 determine the gain of the bridge amplifiers according to the relationship $V_B = V (\Delta R)/(2R)(R_F)/(R)$ where $R_F$ designates the feedback resistors 532 and 534, R designates the bridge resistors 506 and 512, delta R is the change in strain gauge resistance and V is the voltage on the bridge.

Because the output signal from amplifier 516 may be positive or negative, depending upon the direction of the applied torque to the torque measuring strain gauge 504, the amplifier 560 is utilized to assure a positive output signal at all times to be fed into the summing amplifier 570. This is accomplished in the following way. Diode 550 will block positive signals, but will permit negative going signals to enter the inverting port of amplifier 560, as such, the negative going input appears at the output of 560 as a positive signal, on the other hand, diode 554 will block negative going signals, but will permit positive going signals to enter the non-inverting port of amplifier 560, as such, the positive going input will appear at the output of 560 as a negative going signal. 558 is the feedback resistor, and along with 552 and 556 will determine the gain of 560. Summing amplifier 570 is utilized to sum both torque and force signals in the event of a fall that produces both torque and force. In some situations of this nature, neither force alone nor torque alone is sufficiently large to initiate a release, but the combination of the two could exert sufficient stress on the bone to cause injury. Amplifier 570 will function to protect the skier against such a condition in the following way. The output of amplifier 570 represents the signal level on which the decision to release or not release is made. Feedback resistor 574 and variable resistor 564 will determine the amplification 570 gives to the torque signal. Thus (if resistor 564 is properly adjusted), when the torque reaches the predetermined critical value, the corresponding voltage at the output of 570 will be just large enough to trigger the threshold detector (comparator) function of amplifier 590. Likewise, feedback resistor 574 and variable resistor 566 will determine the amplification amplifier 570 gives to the force signal. Thus (if 566 is properly adjusted) when the force reaches the predetermined critical value, the corresponding voltage at the output of amplifier 570 will again be just large enough to trigger the threshold detector (comparator) function of amplifier 590. If both torque and force are present, each will be amplified according to the operation that occurs when each appear alone; however, the two signals will be added together. If the combined signal appearing at the output of amplifier 570 is large enough to trigger the threshold detector function of amplifier 590, a release will be realized.

The output of summing amplifier 570 has two paths through which it can reach the input port of the threshold detector function of amplifier 590. Both of these paths introduce time delays to the signal, but for different reasons. The first of these two paths is through variable resistor 586, capacitor 588 and input resistor 594 to produce a simple, variable RC time constant. The purpose for this delay is to avoid inadvertent release resulting from extremely high impact forces of very short duration such as those experienced when skiers jump, bounce and engage in other highly aggressive activities. The second of the two paths into threshold detector 590 is through amplifier 580 which functions as a linear integrator because of input resistor 582 and feedback capacitor 584. Switch 577, in parallel with capacitor 584, is a normally closed switch; hence, integrator 580 is normally inactive and its normal output voltage will be zero. Under these conditions it has no influence on the actuation of threshold detector 590. When the output voltage of summing amplifier 570 exceeds the value of $V_{Ref}$ on the positive port of threshold detector amplifier 576, the output of 576 will give a step function into the gate of switch 577, and the normally closed switch will open. Switch 577 is a simple electronic switch such as a field effect transistor or complementary metal oxide semiconductor (CMOS) analog switch or even a very small low power reed relay. When switch 577 opens, integrator 580 becomes active and its output will begin to increase at a rate determined by the product of variable resistor 582 and capacitor 584 according to the equation $V_T = (V_{IN}t)/(RC)$, where $V_{IN}$ times t corresponds to the force times time safety feature previously discussed. When the voltage magnitude of the ramp $V_T$ becomes large enough to exceed the predetermined setting of amplifier 590, which acts as a threshold detector, the release will be actuated as described. As illustrated by the equation, resistor 582, which is variable, is used to adjust the slope of the $V_T$ ramp, which adjusts the force times time function of the release system. As soon as the output of amplifier 580 goes below the value of $V_{Ref}$ the output of amplifier 576 will return to the low state, switch 577 will close, and capacitor 584 will discharge, thereby resetting and deactivating integrator 580 in preparation for the next critical situation.

Amplifier 590 is a comparator which acts as a threshold detector and provides a strong step function signal to the release mechanism when the release decision is finally made. The voltage level at which this will happen is slightly larger than $V_{Ref}$ on the positive port of threshold detector-amplifier 590. The actuating device is actuated by the operation of an electrical switch, in this illustration a silicon controlled rectifier 616, the gate of which is protected by zener diode 610 from false triggering by virtue of any inadvertent noise signals from amplifier 590. Resistor 615 grounds the gate in the absence of signal and resistor 614 limits gate current to a safe value in the presence of signal. The silicon controlled rectifier 616, which allows the passage of a large current with a low current trigger pulse, allows amplifier 590 to be a low power integrated circuit type of device, avoiding the limited current gain considerations of transistors utilized as switches. Silicon controlled rectifier 616 acts as an electrical switch to provide current to actuating device 620, which in the illustrated embodiment may be a solenoid (or may be any one of a number of other types of devices, as described above) to convert the electrical signal to a mechanical movement for initiating release of the ski binding, in the manner illustrated, for example, in FIGS. 1 to 5. As more fully disclosed above, other types of electrically actuated mechanisms, such as the explosive device illustrated in FIGS. 10 and 11 or the magnetic latches illustrated in FIGS. 6 and 12 may be used, in lieu of a solenoid, to initiate actuation of any number of release mechanisms such as, by way of example, the three types of release mechanisms respectively illustrated in FIGS. 1, 6 and 8.

The operation of the sensing and actuating circuit illustrated in FIG. 14 occurs in the following manner. (For illustrative purposes, this operation will be described in relation to the apparatus of FIGS. 1 to 5; however, it will be appreciated that this circuit can be utilized with the release mechanisms illustrated in FIGS. 6 to 12 inclusive, or with any other suitably adapted release mechanism for releasing a ski binding in response to an electrical signal.) It is to be noted that, except for strain gauges 504 and 510, which correspond respectively to strain gauges 164 and 124 of the embodiment of FIGS. 1 to 5, actuating means 620, which corresponds to solenoid 110 illustrated in FIGS. 1 and 2 and the power source (not illustrated), all of the remaining electronic components could be micro-miniaturized into an integrated circuit formed on a single chip which could occupy a volume of about one-half cubic inch. This is obviously quite small and could easily be located in the compartment 120, the remaining space being occupied by the power source, such as batteries. A suitable on-off switch (not shown) for the power supply could also be mounted in or atop the compartment 120 or in proximity to lever arm 88 to be actuated by that lever arm when the ski and boot are latched together. Appropriate dials to set the several variable settings of force, torque and time could also be located in or atop compartment 120. Suitably protected electrical leads would interconnect the various electrical components to provide a complete circuit. The leads could be mounted on or in the ski in a manner which would protect them from damage.

In an emergency condition, the weight of the skier would normally be thrown forward or the leg of the skier would be twisted to the left or to the right. If the weight is thrown forward, strain gauge 510 (corresponding to gauge 124 of FIG. 2) is compressed, stressing the strain gauge and changing its resistance, thereby imbalancing bridge circuit 502 to produce an output signal corresponding in magnitude to the imposed force. That output signal is amplified by amplifier 518 and fed to summing amplifier 570 which adds the signals from amplifiers 518 and 516. Variable resistances 564 and 566 are used to adjust the gain of amplifier 570 thereby to set the threshold signal supplied to comparator amplifier 590, based on the skier's individual ability and/or skiing conditions.

The output of amplifier 570 must reach the input of comparator amplifier 590 in order for a release to occur. There are two paths by which the signal from amplifier 570 can reach amplifier 590. The first path is through variable resistor 586, capacitor 588 and input resistor 594. This path provides a momentary delay to avoid inadvertent release due to the high impact, short duration forces described above.

The second path is through amplifier 580, which is a force times time integrator, and in utilizing the output from summing amplifier 570 provides a variable time delay, producing an output which is proportional to force times time because, in some instances, the force or torque may be high, but neither may alone be high enough to require an actuation of the release mechanism. Such a force, existing for excessive lengths of time, can cause injury by producing serious strain on the bone, muscle, ligaments and other tissues. The amplifier 580 will therefore cause a release based upon this condition. This amplifier is an integrator type of amplifier. Variable resistor 582 and capacitor 584 provide the appropriate time constant, to take into account a maximum time period within which a predetermined force may act before an actuation of the release mechanism in response to the force is required. This time constant may be adjusted for skiers of varying degrees of skill, age and/or weight, since resistor 582 is variable. It should be noted that the delay due to the force times time feature of amplifier 580 is considerably longer than the delay seen by the direct path to amplifier 590.

The output of amplifier 580 is inverted, Amplifier 600 is therefore needed to reinvert the signal from amplifier 580 to produce an input voltage to amplifier 590 which has a polarity compatible with the signal produced directly by amplifier 570. Amplifier 590 provides a step function output to actuate silicon controlled rectifier 616, which acts as a switch and, when closed, closes the circuit to solenoid 620. Solenoid 620 corresponds to solenoid 110 shown in FIGS. 1 and 2, and actuation thereof causes the solenoid plunger 114 to be displaced to the right (viewing FIGS. 1 and 2) thereby disengaging from member 90 to release the ski binding in the manner described above.

Because of the electronic controls for sensing force changes and operating the solenoid under proper conditions, release of the ski boot from the binding is achieved almost instantaneously upon sensing a danger condition and without the problems normally caused in prior art devices by substantial frictional forces between moving parts.

In like manner, any substantial strain of strain gauge 504, which corresponds to strain gauge 164 of FIGS. 1 to 5, will change the resistance of strain gauge 504, imbalancing bridge circuit 500 and producing an input signal to amplifier 516. The output signal of amplifier 516 is rectified by amplifier 560, if necessary, to produce a positive input signal to summing amplifier 570. If that input signal, or if the sum of the torque and force signals into amplifier 570, exceeds the variable, predetermined thresholds established by resistors 564 and 566, the resulting signal, following the impact delay provided by RC components 586 and 588 will be of sufficient magnitude at the input of comparator amplifier 590 to initiate a release. The signal from amplifier 570 is also applied to integrating amplifier 580 whose integration time constant is determined by RC components 582 and 584. If the signal appearing at the input of amplifier 580 is integrated for a sufficiently long period of time, the amplitude of the voltage at the output of amplifier 580 will be large enough to exceed the threshold voltage of comparator 590, and the resulting step function output will close the silicon controlled rectifier switch 616 and operate the solenoid 620 in the manner described above with respect to the signal from the force bridge 502.

FIGS. 1 and 2 illustrate a third strain gauge 126 at the heel of the ski boot to sense compressive forces resulting from backward falls. Although this will not be mandatory for advanced skiers, it could be included, if desired, for further safety. If such a strain gauge is required, the sensing circuit, such as shown in FIG. 14, could include an additional normally balanced bridge (not shown) to provide a second input signal to amplifier 518. The sensing of this signal and its response in the circuit would then be the same as described with respect to the signal from bridge 502.

It will be appreciated that the circuit illustrated in FIG. 14 corresponds generally to the schematic diagram of FIG. 13 in the following manner. Torque and force to voltage transducers 1 correspond respectively to transducers 504 and 510. Voltage or current amplifiers 2 correspond to amplifier 516 and 518. Summing amplifier 3 corresponds to amplifier 570. Variable threshold detector 7 corresponds to variable resistors 564, 566, amplifier 570 and threshold detector 590. Variable time delay 4 corresponds to RC components 586 and 588. Force times time detector 5 corresponds to integrating amplifier 580 whose integration time constant is determined by RC components 582 and 584. "OR" gate 6 corresponds to input resistors 612 or 594 for threshold detector 590. Electronic switch 8 corresponds to silicon controlled rectifier 616, and electrical actuator 10 corresponds to solenoid 620.

Figure 15:
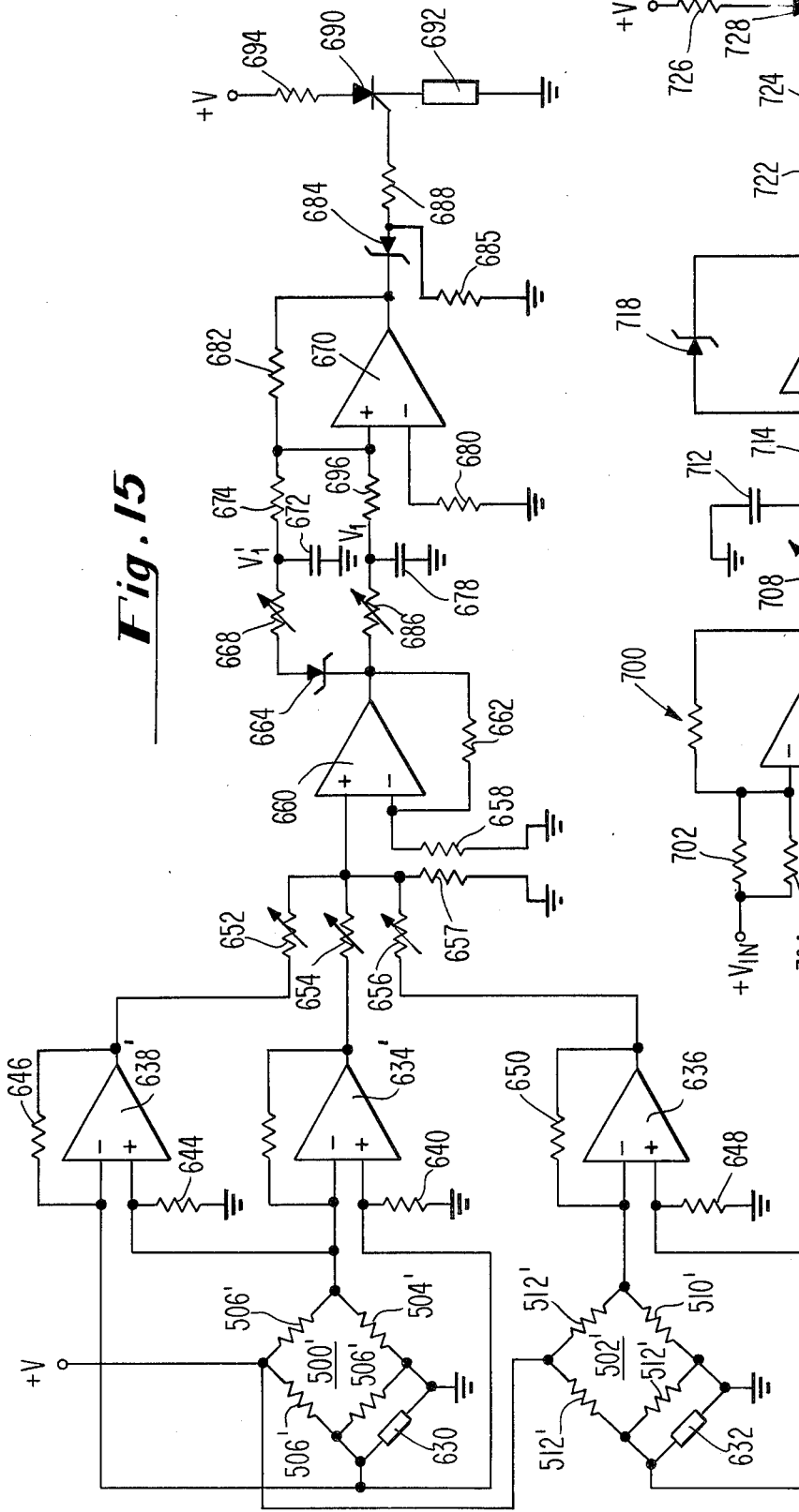
FIG. 15 is a circuit diagram similar to that of FIG. 14 showing yet another embodiment of the invention, utilizing strain gauges and another means of automatic temperature compensation in each bridge circuit.

Viewing FIG. 15, there is illustrated a circuit similar to that of FIG. 14, utilizing transducer type strain gauges, but incorporating thermistors, respectively designated 630 and 632, in parallel with one leg of each of the bridges 500' and 502', to illustrate another more conventional means for temperature compensation. A more significant feature of this circuit is its ability to process the force and torque signals from a one polarity power supply. Where the amplifiers of FIG. 14 require both positive and negative power supplies, this circuit requires only a positive power supply if quadruple integrated circuit amplifiers (four in one package), such as the National Semiconductor Corporation, model number LM 124, are used. Observing that the bright-side output" of bridge 500' goes to the positive port of amplifier 638' and the negative port of amplifier 634' (vice versa for the left side of bridge 500'), it will be appreciated that a positive signal will always result from bridge 500', since amplifier 634' will positively amplify a compressing strain gauge and amplifier 638' will positively amplify an elongated strain gauge. Amplifier 636 will always sense a compressing strain gauge for the force condition. In the same manner as described in FIG. 14 for summing amplifier 570, the variable resistors 652, 654 and 656 are respectively used to set the correct threshold levels of release of the binding for left torque, right torque and forward force. Zener diode 664, variable resistor 668 and capacitor 672 form a non-active, non-linear delay, for a simple version of a force times time circuit, similar to the linear version provided by amplifier 580 of FIG. 14. Zener diode 664 merely sets the voltage level above which the conventional RC delay function of resistor 668 and capacitor 672 can come into play. Variable resistor 686 and capacitor 678 function as the RC type time constant, in the same manner as components 586, 588 of FIG. 14, to cover the forces of short durations and very high magnitudes that the aggressive skier encounters. Again the impact delay of resistor 686 and capacitor 678 is much shorter than the force times time delay of resistor 668 and capacitor 672.

Amplifier 670 is another summing amplifier. In this case the two voltages added together are the "direct signal" developed on capacitor 678 ($V_1$) as it charges and the voltage that develops on capacitor 672 ($V_1'$) as it charges due to the voltage of zener diode 664 being exceeded. Voltage $V_1'$ will always be smaller than $V_1$, regardless of the length of time the charging is permitted to occur. This is due to the voltage drop across zener diode 664, consequently, the gain of amplifier 670 is made larger for $V_1'$ than the gain it gives to $V_1$. The correct gains are established by the values of feedback resistor 682 and input resistor 674 for $V_1'$ and by the values of feedback resistor 682 and input resistor 696 for $V_1$. The output of amplifier 670 in this configuration is uniform, not a step function as used in the embodiment of FIG. 14; however, in this circuit zener diode 684 provides the threshold level above which a release will occur. As soon as the zener voltage level of zener diode 684 is exceeded by a sufficient amount, the switch 690 will close and the release will be actuated.

Thus, in operation, the circuit of FIG. 15 operates as follows. A force signal from bridge circuit 502' or a torque signal from bridge circuit 500' is amplified by the respective amplifier 636, 634 or 638. Amplifier 660 contributes additional gain to any signal existing alone at its input, or will contribute additional gain to both the force and torque signal if they exist at the same time; however, if they do exist simultaneously, amplifier 660 will then add them together. Resistors 652, 654 and 656 will establish the gain that amplifier 660 contributes to each of these signals; consequently, they also provide the means by which the correct threshold of release is achieved. Zener diode 664, resistor 668 and capacitor 672 establish the variable force times time factor, so that if the applied force or torque or both exceed the threshold established by diode 664 for the time period established by the resistor and capacitor 668, 672 the resulting signal being fed into and amplified by amplifier 670 will exceed the threshold level of zener diode 684 to fire silicon controlled rectifier 690 and initiate the operation of electrical actuating means 692, which may be a solenoid, an explosive device or an electro-magnetic latch, all as described above, or any other suitable type of release device.

If the duration of the force represented by the signal output of amplifier 660 exceeds the duration established by the impact delay of variable resistor 686 and capacitor 678, the signal is fed into amplifier 670 and then to fire switch 690 if the appropriate signal level is reached. In this circuit, if a second strain gauge is desired to measure rearward compressive forces, a third balanced bridge could be added to the circuit, similar to bridge 502' and suitably connected to amplifier 636. A signal from this third bridge would then function in the same way as a signal from bridge 502'.

Figure 16:
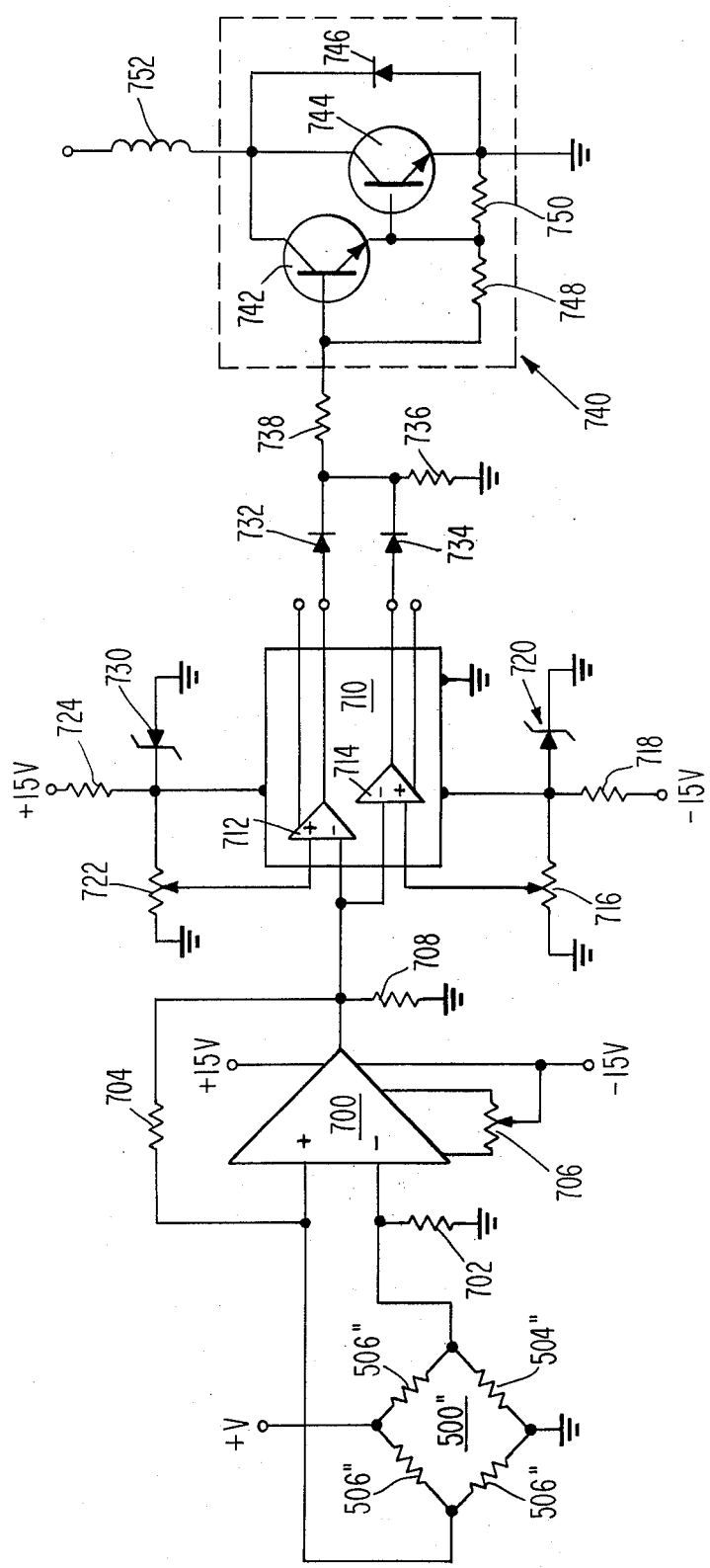
FIG. 16 is a circuit diagram similar to FIG. 14, utilizing a simpler form of amplifier circuitry.

In the embodiment of FIG. 16, strain gauge 504", which is a transducer of the foil or semiconductor type, and resistors 506", form the elements of a normally balanced torque bridge circuit 500", similar to the bridge 500 of FIG. 14. The force sensing bridge is not illustrated, but if it were, it would be a duplicate of the torque bridge shown. Resistors 704 and 702 determine the gain of bridge current amplifier 700.

The amplified signal from amplifier 700 is fed into a threshold detector 710, which is preferably a Motorola dual line receiver, model MC 1584L and which is comprised of a pair of amplifier units 712 and 714, one of which provides the threshold of release for a positive going signal and the other providing the threshold of release for a negative going signal. Resistors 718 and 724 are dropping resistors which function to drop the applied voltage from fifteen volts to five volts since amplifier 710 is a +5 volt device. Variable resistors 716 and 722 establish the threshold levels of torque (left and right) which will produce an output signal from detector unit 710.

Zener diodes 720 and 730 function to reduce and regulate the supply voltage to amplifier 710. Diodes 732 and 734 function to prevent reverse current flow into either of the amplifiers 710 if one is high while the other is low. Resistance 738 is a current limiting resistor to prevent overdrive of amplifier 740.

Amplifier 740 is a "Darlington" amplifier, consisting of transistors 742 and 744, diode 746 and resistors 748 and 750. This unit (a high gain device) is capable of passing the large current required to actuate solenoid 752, while drawing at its input end only a very small amount of current from the low power amplifier 710. When solenoid coil 752 is energized it displaces the solenoid plunger to actuate the binding release mechanism in the manner described, for example, with respect to the embodiment of FIGS. 1 and 2.

Resistors 702, 708 and 736 are used to reference each of the respective devices to ground.

The purpose of variable resistor 706 is to balance the output of amplifier 700 to zero if amplifier 700 happens to be a device that requires this feature.

In the embodiment of FIG. 16, the force times time detector and variable impact time delay and temperature compensation are not illustrated. However, these functions can be achieved by the circuit elements described for those purposes in the embodiment of FIGS. 14 and 15, or other similarly functioning circuit elements, which may be incorporated into the circuit of FIG. 16 in a manner which will readily be appreciated by those skilled in the art.

Figure 17:
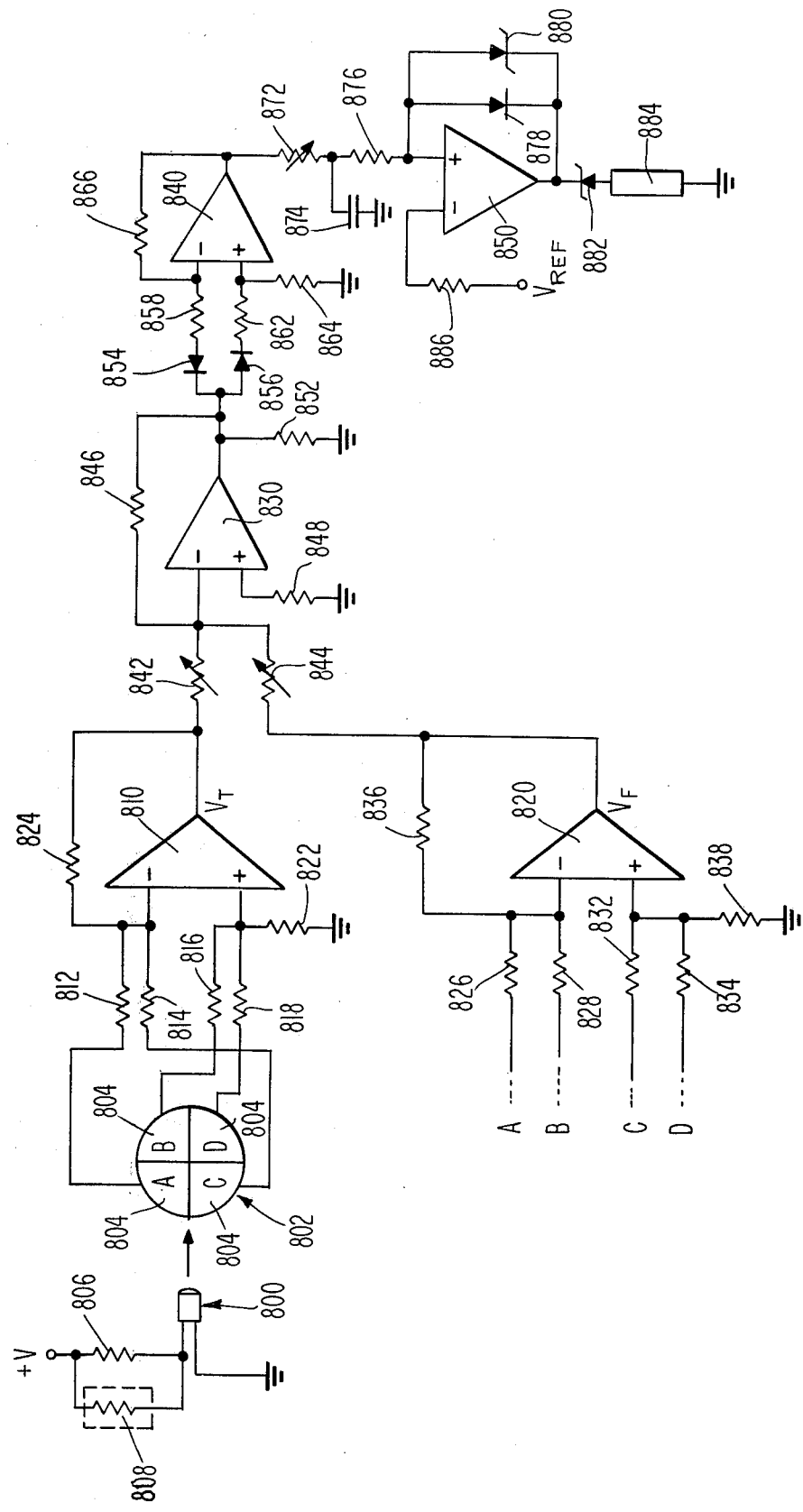
FIG. 17 is a view similar to FIG. 14, utilizing a light emitting diode sensor.

FIG. 17 illustrates an embodiment of the invention utilizing a light emitting diode (LED) 800 and a photodetector 802 to sense the torque and force signals. In this embodiment, the LED 800 is focused on the center of a 4-quadrant photodetector 802 so that equal portions of light fall on all four quadrants, each of which is designated 804. The output signals from LED 800 of detector 802 are balanced to zero for the undeflected beam. Resistor 806 limits the current flowing through the LED 800 to a safe value and resistor 808 is a thermistor to compensate this current for ambient temperature changes, as the LED efficiency changes with changes in temperature.

LED 800 is housed in a stationary member which is rigidly mounted to the ski. The quadrant detector 802 is located in a second member consisting of a base plate by which it is rigidly mounted to the ski and a very stiff but movable portion consisting of the ski boot latching mechanism. On the movable portion is housed the quadrant detector so that it will deflect in proportion to the magnitude and direction of any imposed forces and torques. Because of the extremely fine sensitivity and balance of detector 802, minute deflections of that detector will produce a response in the photodetector. The quadrant detector can be mounted in many ways which will be apparent to those skilled in the art. For example, in the embodiment of FIGS. 8 and 9, if properly modified it could be mounted on stationary member 354. It will be appreciated that the LED 800, the sensor 802 and the optical path between the two will have to be mounted in a suitably protected housing. Also, it is within the purview of this invention to releasably mount the LED on the ski booth latching mechanism and to rigidly mount the quadrant detector on the ski itself.

Amplifiers 810 and 820 are summing differential amplifiers, and as illustrated, take the signal strengths from each of the four quadrants A, B, C, and D to yield a voltage output $V_T = \pm[(V_A + V_C) - (V_B + V_D)]$ from amplifier 810 for the torque signal and $V_F = \pm[(V_A + V_B) - (V_C + V_D)]$ from amplifier 820 for the force signal. The combination of these two signals is also important for those conditions where either force or torque alone is not potentially dangerous, but where the combination thereof may be dangerous. Therefore, the summing amplifier 830 provides that function by yielding a signal which is the appropriate combination of the force voltage and the torque voltage. The gains for these two signals to get the desired threshold of release is set by variable resistors 842 and 844. Amplifier 840 assures a positive going signal for the threshold detector 850. The circuit comprising variable resistor 872 and capacitor 874 provide the impact delay described earlier. The force times time feature is not illustrated but is readily implemented as described with respect to the embodiment of FIG. 14 or of FIG. 15. Amplifier 850 is the threshold detector, and when the output voltage of 840 exceeds $V_{Ref.}$ long enough to satisfy the impact delay time, amplifier 850 will produce a step voltage at its output which will trigger actuator 884 to actuate the release. In this case zener diode 882 protects actuator 884 against an inadvertent trigger due to noise. Diode 878 and zener diode 880 provide single polarity output and current limiting respectively out of amplifier 850 if circumstances require it. The circuit as illustrated would imply that the electrical actuator is a very low current device, such as the explosive mechanism illustrated in FIGS. 10 and 11 since no current amplifying components are utilized to boost the output signal from the lower power integrated circuit amplifier 850, although current amplification could be included if necessary, in a manner which will be apparent to those skilled in the art.

Figure 18:
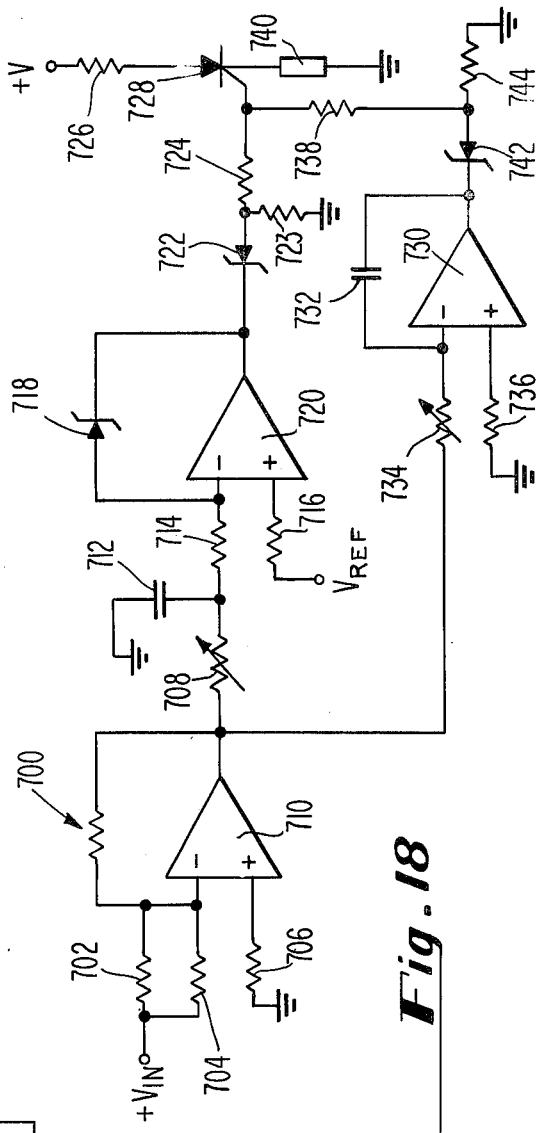
FIG. 18 is a circuit diagram showing how to use a Hall effect resistor to produce the force and torque signals.

FIG. 18 illustrates the use of a "Hall" device in a magnetic field for the sensing of force and torque. A "Hall" effect resistor is the key component to this type of sensing. Material displaying this phenomenon experiences changes in resistance with changes in the strength of the magnetic field passing through it. Hall Effect devices go by a variety of names, some of which are magnistors, magneto-resistors, Hall generators, magnetic flux sensitive resistors, and magnetic diodes. Similar to the LED sensor shown in FIG. 17, the ski boot is latched to a member consisting of two parts, a lower part or base plate securely fastened to the ski and an upper part free to move infinitesimally with respect to the base plate and to which is securely fastened the ski boot. The Hall resistor, shown schematically as 700 in FIG. 18, is securely fastened to the movable upper portion of the mechanism, extending forward and shaped like a thin cylinder. Surrounding the Hall device and rigidly mounted on the ski are four V-pointed permanent magnets. Two vertically opposed magnets have a "south" polarity and the two horizontally disposed magnets have a "north" polarity. The magnets are equally spaced apart and the Hall resistor is located at their geometric center. In this arrangement, rotation of the movable portion of the ski boot latching mechanism, to which the boot is securely attached, causes the Hall resistor 700, which is mounted on the front of the mechanism, to move into stronger regions of the magnetic field created by the four magnets. The resulting increase in resistance of resistor 700 causes an increase in voltage gain. The new output is equal to the input voltage across resistor 702 times the new resistance of resistor 700 divided by the resistance of resistor 702. Resistor 704 is a thermistor to provide temperature compensation. Therefore the output voltage of amplifier 710 increases with the voltage gain caused by resistor 700. When the output voltage of amplifier 710 is large enough to exceed the value of $V_{Ref.}$ it will trigger the threshold detector 720. Variable resistor 708 and capacitor 712 provides the variable impact time delay which must be satisfied before detector 720 will respond, while amplifier 730 performs as the force times time detector as shown in FIG. 14, but without the reset circuit shown. Current amplification for final electrical actuation is provided at the final stage when the zener voltage of diode 722 or diode 742 is exceeded therefore allowing SCR switch 728 to fire. Zener diode 718 is a current limiting device to prevent saturation of amplifier 720. Resistors 724 and 738 limit the gate current to the SCR to a safe value. Resistor 716 is the input resistor to the reference port of threshold detector 720 while resistors 736, 723 and 744 are resistances to ground. Silicon controlled rectifier 728 is an actuating switch to energize actuating means 740 to release the ski binding when the signal from threshold detector 720 or amplifier 730 is of sufficient magnitude.

It is to be noted that the displacement of the Hall resistor 700 will be proportional to the force acting on the skier's boot and that the resulting output signal from amplifier 710 will correspond to the force imposed on the ski boot.

FIG. 19 illustrates an embodiment where force and torque are detected through the use of a force switchable diode (FSD) as the sensor media. Electrically, an FSD is a diode; however, where a conventional diode will conduct electrical current when the voltage impressed upon it is of sufficient magnitude and proper polarity, an FSD will conduct electrical current when the mechanical force exerted upon it exceeds a predetermined value. As such, the FSD is utilized in this invention as an "event detector"; that is, when the torque or force exceeds the predetermined threshold of safety, the FSD will serve two functions. First, as shown in FIG. 19, it will act as switches 750 and 752, the closure of either of which will provide voltage to the electrical switch 760. When the FSD is in the condition represented by switch 750 it will indicate sensed torques, and in the condition represented by switch 752 it will indicate sensed force. However, there will be no actuation of switch 760 until the voltage exists for a sufficiently long period of time to satisfy the variable impact time delay established by variable resistor 754 and capacitor 756. At that time, the switch 760 will close, thereby providing electrical current to the actuator 764 to provide an electrical release of the ski binding. Since the FSD is an "ON-OFF" device, there is no force times time detection function available in the same sense as described above with respect to FIG. 13. This system has the great advantage that there is no drain whatsoever on the power supply until a release is called for. Resistor 758 limits the gate current of SCR 760 to a safe value, and resistor 762 limits the current to actuator 764 to its rated value, while resistor 753 references the actuating circuit to ground while allowing capacitor 756 to discharge between impulse voltages.

Another material that can be used in the embodiment of FIG. 19 a variable conductance elastomer such as that sold under the trademark "Pressex," which the absence of pressure, behaves as an open switch, while the application of sufficient pressure will cause it to compress and behave like a closed switch. The main difference between the FSD and Pressex is the amount of movement needed to realize closure of the switch. For the FSD this movement is in the order of microinches, whereas the Pressex requires considerably more movement, in the order of 1 to 40 mils, depending on module design.

Yet another material which can be used to sense force and torque and produce a signal corresponding in magnitude to the imposed force or torque is a piezoelectric element which, when stressed, experiences a change in the electrical charge within its boundaries. This change is accompanied by a corresponding change in capacitance which may be used to actuate an appropriate charge amplifying circuit to operate a suitable binding release actuator.

It will be appreciated that there have been disclosed herein numerous embodiments of this invention and that many other changes are possible using the principles of this invention without departing from the spirit and scope of this invention as defined in the appended claims. For example, although three types of ski bindings have been illustrated, many other types of bindings exist, and each may require a slightly different location of force and torque sensing elements and a different type of release mechanism may be required in order to effect the fastest and most reliable release.

The particular force and torque sensing means and circuits can vary widely, as has been disclosed, and other types of sensing means and circuits may be utilized without departing from the purview of this invention. Likewise, power sources may vary, the use and type of dial controls to adjust the invention for different skiers' abilities and for skiing conditions may vary within wide limits, and many types of actuating means other than the solenoid, explosive and electromagnetic means disclosed will be apparent to the skilled artisan. Moreover, numerous combinations of the ski bindings, release mechanisms and force and torque sensing and actuating circuitry disclosed and suggested herein are possible without departing from the spirit and scope of this invention.

What is claimed is:

1. A system for operating ski binding means releasably mounting a ski boot on a ski, said system comprising:
(a) at least one sensing means for sensing at least one type of force between the ski and ski boot in magnitude to the magnitude of at least one of the forces being sensed;
(b) second means electrically connected to said sensing means, said second means receiving and responding to the magnitude and duration of said first electrical signal to produce at least one second electrical signal, said second electrical signal being a function of the magnitude of said forces and of at least one non-instantaneous time characteristic thereof;
(c) third means electrically connected to said second means, said third means being responsive to the signals produced by said second means to produce an actuating signal when said second electrical signal exceeds at least one predetermined value; and
(d) actuating means electrically connected to said third means, said actuating means receiving and responding to said actuating signal to release the ski binding means to allow the ski boot to be separated from the ski.

2. Apparatus as set forth in claim 1, wherein said sensing means comprises a transducer.

3. Apparatus as set forth in claim 1, wherein said sensing means comprises linear force sensing means for sensing linear forces and for producing one of said first electrical signals corresponding to the magnitude of said linear forces, and torque sensing means for sensing torques and for producing another of said first electrical signals corresponding to the magnitude of said torques.

4. Apparatus according to claim 3, and further including summing means electrically connected to said linear force sensing means and to said torque sensing means for receiving and summing said first electrical signals produced by said linear force sensing means and said torque sensing means, and for transmitting the summed first electrical signals to said second means.

5. Apparatus as set forth in claim 1 including control means connected to said third means for adjusting the predetermined value at which said third means produces such actuating signal, whereby the force and time characteristics in response to which the actuating means is actuated can be adjusted to accommodate the capabilities of the individual skier and the skiing conditions.

6. Apparatus as set forth in claim 1, wherein said actuating means comprises a solenoid.

7. Apparatus as set forth in claim 1, wherein said actuating means comprises an electrically fired cartridge.

8. Apparatus as set forth in claim 1, wherein said actuating means comprises an electrically actuable explosive device, housing means for containing said explosive device, and latching means interconnecting said explosive device and the binding means and operatable to release the binding means, said explosive device operating said latching means in response to actuation of said explosive device to release the binding means.

9. Apparatus as set forth in claim 9, wherein said actuating means comprising: a permanent magnet, electro-magnetic means operatively associated with said binding means and said permanent magnet, said electro-magnetic means being positioned and constructed to move relative to said permanent magnet in response to the energization of said electro-magnetic means to release said binding means, and means for energizing said electro-magnetic means in response to said actuating signal.

10. Apparatus as set forth in claim 1, including adjusting means connected to said sensing means for automatically adjusting said sensing means to compensate for the effects of changing temperature on the behavior of said sensing means.

11. Apparatus as set forth in claim 1, wherein said second means comprises force times time means for generating one of said second electrical signals, said one of said second electrical signals corresponding to the integral of sensed force with respect to time.

12. Apparatus as set forth in claim 11, wherein said force times time means comprises a linear integrator.

13. Apparatus as set forth in claim 12, wherein said linear integrator comprises an amplifier having an input terminal, a variable resistance means in series with said input terminal and a capacitive means connected in parallel with said amplifier.

14. Apparatus as set forth in claim 1 wherein said second means produces at least two of said second signals, one of said second signals being a function of the magnitude of sensed force and a predetermined period of time and the other of said second signals being a function of sensed force with respect to time.

15. Apparatus as set forth in claim 1, wherein said sensing means comprises a normally balanced bridge circuit including, in one leg thereof, means for producing said first electrical signal in response to a linear force or torque acting on said last-named means.

16. Apparatus as set forth in claim 15, including at least two normally balanced bridge circuits connected to said second means, one of said circuits being adapted to measure linear forces and the other of said circuits being adapted to measure torques.

17. Apparatus as set forth in claim 16, including a summing amplifier interconnected between said bridge circuits and said second means for summing the signals from each of said force measuring bridge circuit and said torque measuring bridge circuit.

18. Apparatus as set forth in claim 16, including temperature compensating means connected to at least one leg of each bridge circuit to adjust for the effects of change of temperature on the behavior of said sensing means.

19. Apparatus as set forth in claim 15, wherein said means to sense linear forces and torques comprises a transducer.

20. Apparatus as set forth in claim 1, wherein said binding means comprises clamping means mounted on said ski and securing said boot on said ski, wherein said sensing means are mounted on said clamping means or said ski proximate said boot.

21. Apparatus according to claim 1 wherein said second means comprises impact time delay means for producing one of said second electrical signals, the magnitude of said one of said second electrical signals delaying the magnitude of said first electrical signal by a first predetermined period of time, and force times time means for producing a second of said second electrical signals, said second of said second electrical signals being a function of the magnitude of said first electrical signal and a second predetermined period of time, and said third means produces said actuating signal when any of said second electrical signals exceeds a predetermined value.

22. Apparatus as set forth in claim 1 wherein said second means comprises impact time delay means for generating one of said second electrical signals, said one of said second signals being a function of the magnitude of the first electrical signal and a predetermined period of time.

23. Apparatus as set forth in claim 22, wherein said impact time delay means for generating one of said second electrical signals, the magnitude of said one of said second electrical signals delaying said first electrical signal by a first predetermined period of time.

24. Apparatus as set forth in claim 22, wherein said impact time delay means comprises means for varying said first predetermined period of time.

25. Apparatus according to claim 22 wherein said impact time delay means comprises resistance means and a capacitance means connected in series and said predetermined period of time is the product of the resistance of said resistance means and the capacitance of said capacitance means.

26. Apparatus according to claim 25 wherein said resistance means comprises variable resistance means and includes means for selectively changing the resistance of said resistance means.

27. Apparatus according to claim 1 and further including means for transmitting forces from the ski boot to said sensing means, said force transmitting means including surfaces engageable with structure associated with the ski, and said surfaces comprise a low coefficient of friction material to facilitate the movement of said surfaces relative to the structure.

28. Apparatus according to claim 1 wherein said one sensing means includes means for producing said first electrical signal contemporaneously with said forces being sensed, and said second means includes means for producing said second electrical signal at a delayed time after the production of said first electrical signal.

29. A method of automatically releasing a ski boot from a ski on which the ski boot is mounted, in the event of danger to the skier, the method comprising the steps of: constantly monitoring the forces acting on a skier's leg, generating force signals representative of the forces acting on the skier's leg; developing a threshold signal representative of the maximum stresses to be tolerated by the skier's leg; developing a control signal whose continuous magnitude is dependent both upon the magnitude and duration of the force signals; comparing said control signal with said threshold signal and releasing the ski boot from the ski upon the control signal reaching a value at least equal to that of said threshold signal.

30. The method of claim 29, wherein force signals leading to different loads on the skier's leg, e.g. torsion or bending loads, are separately recorded and compared with one threshold signal, respectively.

31. A device for automatically releasing a ski boot from a ski on which the ski boot is mounted, in the event of danger to the skier, the device comprising; a ski boot holder; locking means for fixing said ski boot holder to the ski; monitoring means in the form of a pressure recorder for continuously monitoring the forces acting on a skier's leg and comprising; first generating means for generating first signals representative of the forces acting on the skier's leg; second generating means for developing a predetermined threshold signal representative of the maximum stresses to be tolerated by the skier's leg; third generating means for developing control signals whose continuous magnitudes are dependent upon both the magnitude and duration of said first signals; comparator means for comparing said control signals with said threshold signal; and a threshold value switch for controlling the locking means and for unlocking the locking means to release the ski boot from the ski upon the control signals reaching a value at least equal to that of said threshold signal.

32. The device of claim 31, wherein the third generating means is an integrator.

33. The device of claim 31, wherein the integrator has an adjustable time constant.

34. The device of claim 31, wherein a capacitive or inductive pick-up serves as the force monitor.

35. The device of claim 31, wherein a piezoelectric element is used as the force monitor.

36. The device of claim 31, wherein a magnetoelastic pressure guage is used as the force monitor.

37. The device of claim 31, wherein the locking means takes the form of a release mechanism having an actuating element held normally in the unstable state of equilibrium.

38. The device of claim 37, wherein the actuating element is coupled to a control organ of the threshold value switch.

39. The device of claim 31, wherein sole holders engage on the toe and heel of the ski boot and serve as the ski boot holders.

40. The device of claim 31, wherein at least some elements of the device are housed in the sole of a ski boot.

41. An automatically operable safety fastener operated under control of extraneous influence, comprising means for sensing and transducing into an electrical signal at least one force applied to at least one element of the fastener, first comparison means for comparing the electrical signals so derived with a predetermined minimal value, means connected to said first comparison means for integrating with respect to time said transduced signal to provide an integrated signal output only when the magnitude of the transduced signal is larger than said predetermined minimal value, second comparison means for comparing said integrated signal with a predetermined maximum value, and fastener unlocking means actuated only when the magnitude of said integrated signal is greater than the magnitude of said predetermined maximum value, wherein said unlocking means comprise magnetic or electromagnetic locking circuits and means for saturating or desaturating said circuits when said integral is higher than said predetermined maximum value.

42. An automatically operable safety fastener operated under control of extraneous influence, comprising means for sensing and transducing into an electrical signal at least one force applied to at least one element of the fastener, first comparison means for comparing the electrical signals so derived with a predetermined minimal value, means connected to said first comparison means for integrating with respect to time said transduced signal to provide an integrated signal output only when the magnitude of the transduced signal is larger than said predetermined minimal value, second comparison means for comparing said integrated signal with a predetermined maximum value, and fastener unlocking means actuated only when the magnitude of said integrated signal is greater than the magnitude of said predetermined maximum value, wherein said sensing and transducing means provide at least two different signals each corresponding to a force applied to an element of said fastener, said signals being processed by a mixing circuit before being fed to said integrating and first comparing means.

43. An automatically operable safety fastener operated under control of extraneous influences, comprising means for sensing and transducing into an electrical signal at least one force applied to at least one element of the fastener, first comparison means for comparing the electrical signals so derived with a predetermined minimal value, means connected to said first comparison means for integrating with respect to time said transduced signal to provide an integrated signal output only when the magnitude of the transduced signal is larger than said predetermined minimal value, second comparison means for comparing said integrated signal with a predetermined maximum value, and fastener unlocking means actuated only when the magnitude of said integrated signal is greater than the magnitude of said predetermined maximum value, wherein said sensing and transducing means comprise strain gauge sensors mounted in bridge connection and connected to operational amplifiers the output signal of which is transmitted to said integrating and comparing means through an absolute value setting circuit.

44. A fastener according to claim 43, wherein said integrator means comprise an operational amplifier the input of which is connected to the output of said absolute value setting circuit and a capacitor connected in parallel between said input and said output of the operational amplifier.

45. A fastener according to claim 44, wherein said first comparison means comprise a field effect transistor the drain and the source of which are connected across said integrating capacitor and the trigger gate of which is connected to the output of an operational amplifier the input of which is connected to the output of said absolute value setting circuit and the other input of which is fed with a reference voltage corresponding to said minimum value.

46. A fastener according to claim 43, wherein said second comparison means comprise an operational amplifier the input of which is fed with the output signal from said integrator means and the other input of which is fed with a reference voltage corresponding to said predetermined maximum value whereas the output of which is connected to said unlocking means.

47. A method of automatically unlocking a safety fastener upon the occurrence or under the action of predetermined critical extraneous influences, comprising the steps of sensing and measuring at least one force applied to at least one element of said fastener and comparing said measured force with a predetermined minimum value, wherein the improvement consists in that said method also comprises the steps of integrating said force with respect to time to provide an integrated force greater than zero only when the measured force exceeds said predetermined minimum value, said integrated force being equal to zero for all values of the measured force less than the minimum value, comparing the magnitude of said integrated force with a predetermined maximum value, and automatically unlocking said fastener when said integrated force, for a measured force higher than said minimum value, becomes higher than said predetermined maximum value, consisting in unlocking said fastener by magnetical saturation or desaturation of a fastener locking magnetic or electromagnetic circuit.

48. A method of automatically unlocking a safety fastener upon the occurrence or under the action of predetermined critical extraneous influence, comprising the steps of sensing and of measuring at least two forces acting upon elements of said fastener, combining said forces into a resulting force, processing said resulting force by comparing it with a predetermined minimum value, by integrating it with respect to time to provide an integrated force greater than zero only when the measured force exceeds the predetermined minimum value, by comparing said integral with a predetermined maximum value and unlocking said fastener when said integral of the resulting force becomes higher than said maximum value for a resulting force above said minimum value, the integral of said resulting force being zero for all values of said resulting force below said predetermined minimum value.

* * * * *